(12) United States Patent
Takaki et al.

(10) Patent No.: US 7,921,438 B2
(45) Date of Patent: Apr. 5, 2011

(54) CHUCKING MECHANISM, BRUSHLESS MOTOR HAVING THE CHUCKING MECHANISM, AND DISK DRIVING APPARATUS HAVING THE BRUSHLESS MOTOR

(75) Inventors: Hitoshi Takaki, Kyoto (JP); Yusuke Iwai, Kyoto (JP); Tomoya Uchimura, Kyoto (JP); Satoru Kuramoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 856 days.

(21) Appl. No.: 11/841,340

(22) Filed: Aug. 20, 2007

(65) Prior Publication Data

US 2008/0046905 A1 Feb. 21, 2008

(30) Foreign Application Priority Data

Aug. 21, 2006 (JP) ................. 2006-224558

(51) Int. Cl.
G11B 17/03 (2006.01)
G11B 17/028 (2006.01)
G11B 19/20 (2006.01)

(52) U.S. Cl. ........................ 720/707; 720/604

(58) Field of Classification Search .............. 720/703, 720/704, 706, 707, 709, 604
See application file for complete search history.

(56) References Cited

U.S. PATENT DOCUMENTS

| | | | |
|---|---|---|---|
| 6,041,033 A | 3/2000 | Otsubo et al. | |
| 6,961,949 B2 | 11/2005 | Horng et al. | |
| 7,493,633 B2 | 2/2009 | Ikemoto | |
| 2006/0048176 A1* | 3/2006 | Choi et al. ............. | 720/707 |
| 2008/0046903 A1 | 2/2008 | Takaki et al. | |
| 2008/0046904 A1 | 2/2008 | Takaki et al. | |
| 2008/0046906 A1 | 2/2008 | Takaki et al. | |

FOREIGN PATENT DOCUMENTS

| | | |
|---|---|---|
| JP | 7-220353 A | 8/1995 |
| JP | 11-306628 A | 11/1999 |
| JP | 11-339348 A | 12/1999 |
| JP | 2000-67497 A | 3/2000 |
| JP | 2000-149363 A | 5/2000 |
| JP | 2000-215570 A | 8/2000 |
| JP | 2002-237118 A | 8/2002 |
| JP | 2005038465 A | 2/2005 |
| JP | 2005251298 A | 9/2005 |
| JP | 2005251299 A | 9/2005 |
| JP | 2005251300 A | 9/2005 |
| JP | 2005251301 A | 9/2005 |
| JP | 2005251302 A | 9/2005 |
| JP | 2005251303 A | 9/2005 |
| JP | 2005251304 A | 9/2005 |
| JP | 2005251305 A | 9/2005 |
| JP | 2005251306 A | 9/2005 |
| JP | 2006127758 A | 5/2006 |
| JP | 2007059040 A | 3/2007 |
| KR | 10-0278595 B1 | 1/2001 |
| KR | 10-2006-0097611 A | 9/2006 |

* cited by examiner

Primary Examiner — Craig A. Renner
Assistant Examiner — Gustavo Polo
(74) Attorney, Agent, or Firm — Westerman, Hattori, Daniels & Adrian, LLP

(57) ABSTRACT

A claw member includes at a radially inward surface thereof a protrusion inclined surface in order to minimize deformation occurring in an axial direction to an elastic member which is a coil spring. The protrusion inclined surface is preferably inclined, when a tip portion of the claw member is at an axially lowest point, to be substantially perpendicular to the central axis, or such that the further radially inward a portion thereof is the axially lower the portion is. By virtue of such configuration, the protrusion inclined surface minimizes deformation occurring to the elastic member in the axial direction.

18 Claims, 19 Drawing Sheets

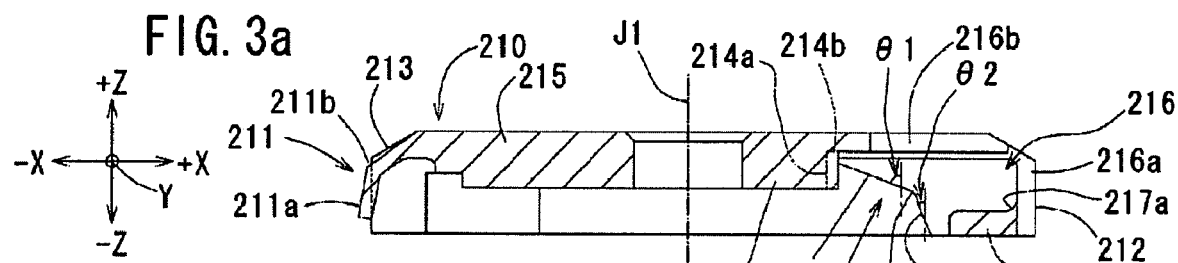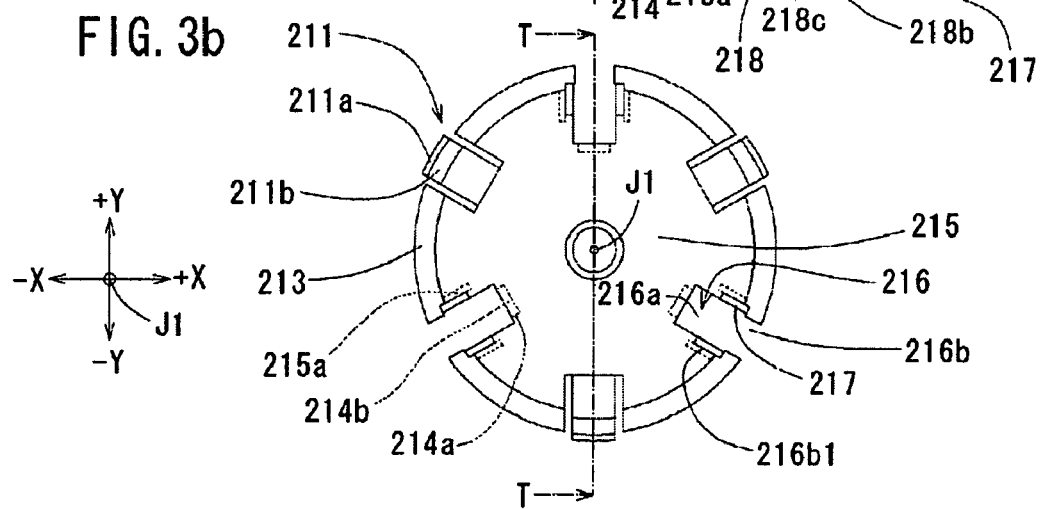

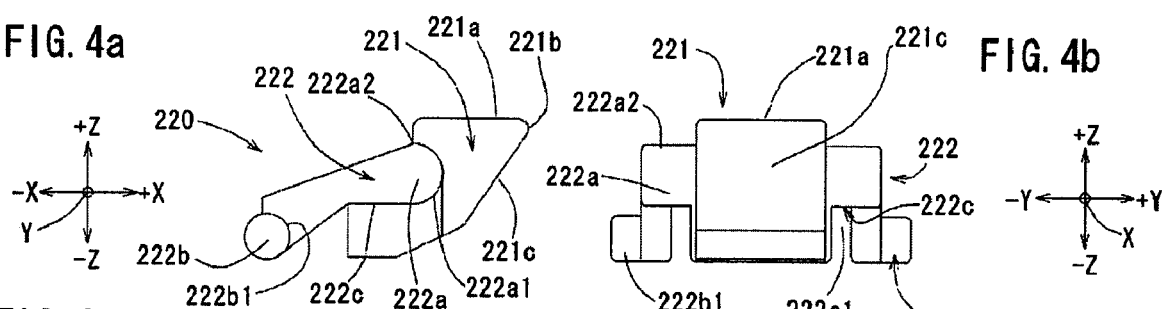
FIG. 4a
FIG. 4b
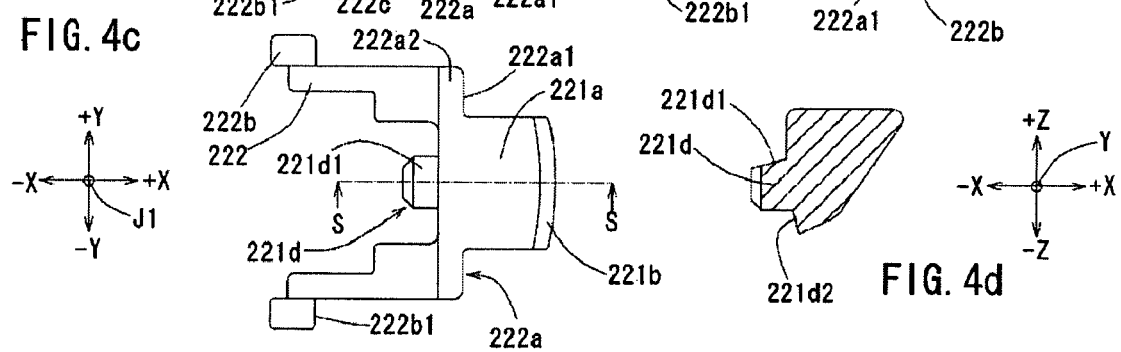
FIG. 4c
FIG. 4d

CHUCKING MECHANISM, BRUSHLESS MOTOR HAVING THE CHUCKING MECHANISM, AND DISK DRIVING APPARATUS HAVING THE BRUSHLESS MOTOR

BACKGROUND OF THE INVENTION

1. Field of the Invention

The present invention relates to a chucking mechanism operable to detachably set thereon a discoid disk, and to a motor including the chucking mechanism, and a disk driving apparatus including the motor.

2. Description of Related Art

In recent years, a slot loading mechanism in which a disk is slid in and out of a disk driving apparatus is used in a personal computer (hereinafter, referred to as PC). This mechanism is particularly useful for a PC having a slim shape.

The slot loading mechanism requires no tray moving the disk to a spindle motor which rotates the disk, and therefore is allowed to be slim. However, there is an increased demand to further slim down the disk driving apparatus. In order to further slim down the disk driving apparatus, the spindle motor used therein also needs to be slimmer. It is, however, a difficult task to reduce a thickness of a chucking mechanism on which the disk is removably set and which is arranged in the spindle motor.

Also, the disk driving apparatus having applied thereon the slot loading mechanism usually retains the disk by itself without using a clamping member in order to achieve a thin chucking mechanism.

FIG. 14 is a diagram showing a cross sectional view, in an axial direction, of a conventional configuration of the chucking mechanism.

According to FIG. 14, a chucking mechanism 1 includes a turn table 2 having a disk setting surface 2a on which a disk (not shown in FIG. 14) having a central opening portion, a center case 3, a plurality of claw members 4, and a coil spring 5 which is an elastic member providing a radial force for each claw member 4. The center case 3 includes a cylindrical portion 3a around which an inner circumferential surface of the central opening portion of the disk will be arranged, a top plate portion 3b arranged such as to cover a top end of the cylindrical portion 3a, and a plurality of openings 3c allowing the claw members 4 to move therethrough. The claw member 4 includes a disk retaining surface 4a which makes contact with the central opening portion so as to retain the disk, and a sliding surface 4b which guides movements of the claw member 4. Also, the center case 3 preferably includes an upward guiding surface 3d which makes contact with the claw member 4 so as to guide a sliding movement of the claw member 4. Also, the claw member 4 includes at an inner circumferential surface thereof a protrusion 4c which makes contact with the coil spring 5.

Next, a movement of the claw member 4 in an axially downward direction when a disk 6 is set on the chucking mechanism 1 will be described with reference to FIGS. 15 and 16. FIG. 15 is a cross sectional view of the conventional chucking mechanism 1 when the disk 6 begins to make contact with the claw member 4. FIG. 16 is a cross sectional view of the conventional chucking mechanism 1 in which a tip portion of the claw member 4 is at an axially lowest position. Hereinafter, the disk 6 is a multilayered disk including an upper disk base 6b and a lower disk base 6c pasted to one another.

According to FIG. 15, the claw member 4 makes contact at a top surface thereof with a bottom end of the central opening portion 6a of the disk 6, the lower side surface of the disk retaining surface 4a slides with the upper guiding surface 3d, and then the tip portion 4b of the claw portion 4 moves in the axially downward direction while an entire claw member 4 moves in a radially inward direction.

SUMMARY OF THE INVENTION

A chucking mechanism according to the present invention, a claw member includes a movement pivot portion and a movement support portion at a portion of the claw member radially further inward than the movement pivot portion in order to allow the claw member to move in a radial and an axial direction. When the movement support portion makes contact with the movement support receiving portion, the radial movement of the claw member is well supported, and therefore, a disk will be retained by the chucking mechanism effectively.

Other features, elements, steps, characteristics and advantages of the present invention will become more apparent from the following detailed description of preferred embodiments thereof with reference to the attached drawings.

BRIEF DESCRIPTION OF THE DRAWINGS

FIG. 3a is a schematic cross sectional view of a center case of the present invention.

FIG. 3b is a plan view of the center case as seen from above.

FIG. 4a is a side view of a claw member of the present invention.

FIG. 4b is a front view of the claw member of the present invention.

FIG. 4c is a plan view of the claw member of the present invention.

FIG. 4d is a schematic cross sectional view of the claw member of the present invention at line S-S of FIG. 4c.

DETAILED DESCRIPTION OF PREFERRED EMBODIMENTS

Figure 1:
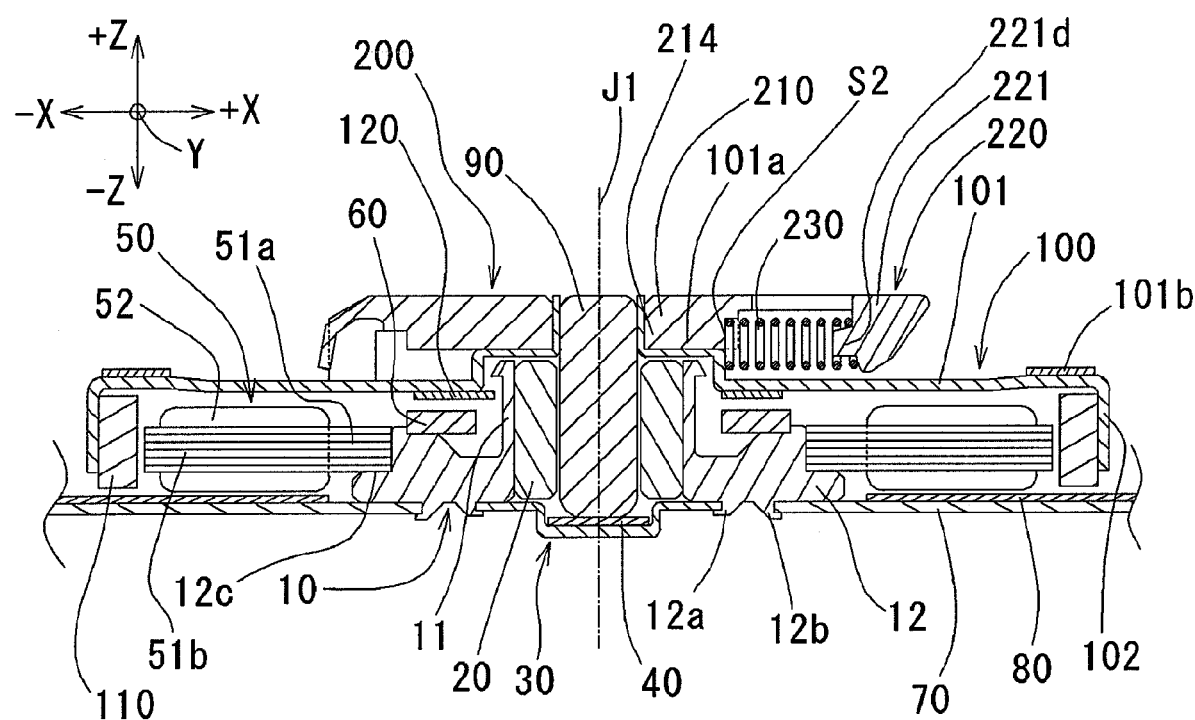
FIG. 1 is a schematic cross sectional view in an axial direction showing a brushless motor according to a preferred embodiment of the present invention.

Note that in the description of the preferred embodiments of the present invention herein, words such as upper, lower, left, right, upward, downward, top, and bottom for describing positional relationships between respective member and directions merely indicate positional relationships and directions in the drawings. Such words do not indicate positional relationships and directions of the member set in an actual device. Also note that a direction parallel to Z axis herein will be referred to as an axial direction. Also, note that the reference numerals, figure numbers and supplementary descriptions are shown below for assisting the reader in finding corresponding components in the description of the preferred embodiments below to facilitate the understanding of the present invention. It should be noted that these expressions in no way restrict the scope of the present invention.

Structure of Brushless Motor

Hereinafter a brushless motor according to a preferred embodiment of the present invention will be described with reference to FIG. 1. FIG. 1 is a schematic cross sectional view in an axial direction of a brushless motor according to a preferred embodiment of the present invention.

Hereinafter, a stator portion of the brushless motor will be described.

A housing 10 preferably having a substantially cylindrical shape concentric with a central axis J1 is preferably made by a deformation process such as cutting performed on a copper base material. A sleeve 20 is affixed to an inner circumferential surface of a cylindrical portion 11 of the housing 10. The sleeve 20 preferably having a substantially cylindrical shape is a sintered member impregnated with oil.

The housing 10 preferably includes at a portion axially below the cylindrical portion 11 a stator base portion 12 preferably having a substantially cylindrical shape extending radially outward, wherein the cylindrical portion 11 and the stator base portion 12 are preferably formed integrally. The stator base portion 12 preferably includes at a bottom surface thereof a protrusion extending radially inward and a protrusion extending radially outward (hereinafter, referred to as inner circumferential protrusion 12a and outer circumferential protrusion 12b, respectively). A plate 30 is arranged extending inwardly from the inner circumferential protrusion 12a. The plate 30 and the inner circumferential protrusion 12a are affixed to one another by calking. A thrust plate 40 preferably having a substantially disk shape preferably made of a material excellent in abrasion resistance quality is arranged axially above the plate 30.

The housing 10 preferably includes at an outer circumferential portion of the stator base portion 12 a stator setting portion 12c for setting thereon a stator 50 (described below). The stator 50 preferably includes a stator core 51 having a core back portion 51a, a plurality of tooth portions 51b each extending radially outward of the core back portion 51a, and a plurality of coils 52 each formed by winding a plurality of times a conductive wire around each tooth portion 51b.

The housing 10 preferably includes at a portion radially inward of the stator 50 of the stator base portion 12 a pressuring magnet 60 preferably having a substantially annular shape. The pressuring magnet 60 is arranged such as to axially oppose a bottom surface of a lid portion 101 of a rotor holder 100 (described below).

An attachment board 70 is affixed by calking to the housing 10 at an outer circumferential surface of the outer circumferential protrusion 12b. A circuit board 80 for controlling a rotation of the brushless motor is arranged on a top surface of the attachment board 70. An axially lower portion of the stator 50 is preferably covered by the circuit board 80 and the attachment board 70.

Hereinafter, a rotor portion of the brushless motor will be described.

A shaft 90 is inserted in an inner circumferential surface of the sleeve 20 in a concentric manner with the central axis J1. The shaft 90 is rotatably supported in a radial direction by the inner circumferential surface of the sleeve 20 while the same is supported in the axial direction by the thrust plate 40.

A rotor holder 100 preferably having an operculated and substantially cylindrical shape is affixed at an upper portion of the shaft 90 so as to cover the stator 50. The rotor holder 100 is preferably formed by pressing a magnetic steel plate. Also, the rotor holder 100 preferably includes a lid portion 101 and a cylindrical portion 102. The lid portion 101 preferably includes at a portion axially corresponding to the sleeve 20 and the cylindrical portion 11 a leveled portion 101a. By virtue of such configuration, the sleeve 20 can be extended in the axial direction. At a bottom surface of the leveled portion 101a a stopper member 120 for preventing the rotor holder 100 from being removed in the axial direction is arranged.

A rotor magnet 110 is arranged at an inner circumferential surface of the cylindrical portion 102. An inner circumferential surface of the rotor magnet 110 is opposed, via a gap in the radial direction, to an outer circumferential surface of the tooth portions 51b of the stator 50.

A center case 210 of a chucking mechanism 200 for detachably setting thereon a disk (not shown in FIG. 1) is arranged on a top surface of the lid portion 101. A disk setting portion 101b for setting thereon the disk is arranged at an outer end of the lid portion 101. According to the present preferred embodiment of the present invention the rotor holder 100 functions as a turn table.

Chucking Mechanism

Figure 2:
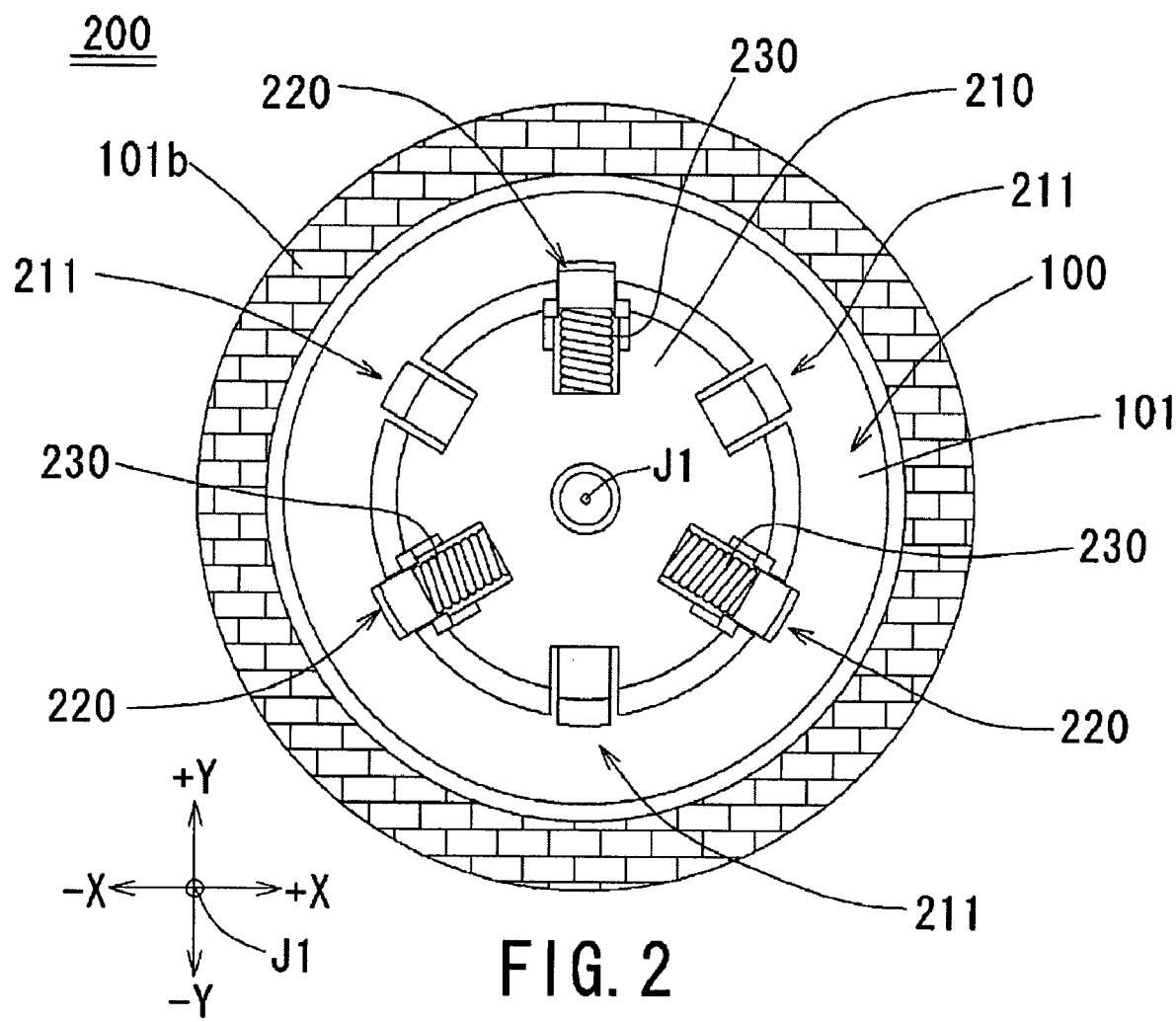
FIG. 2 is a plan view of a chucking mechanism of the present invention as seen from above.
Figure 5:
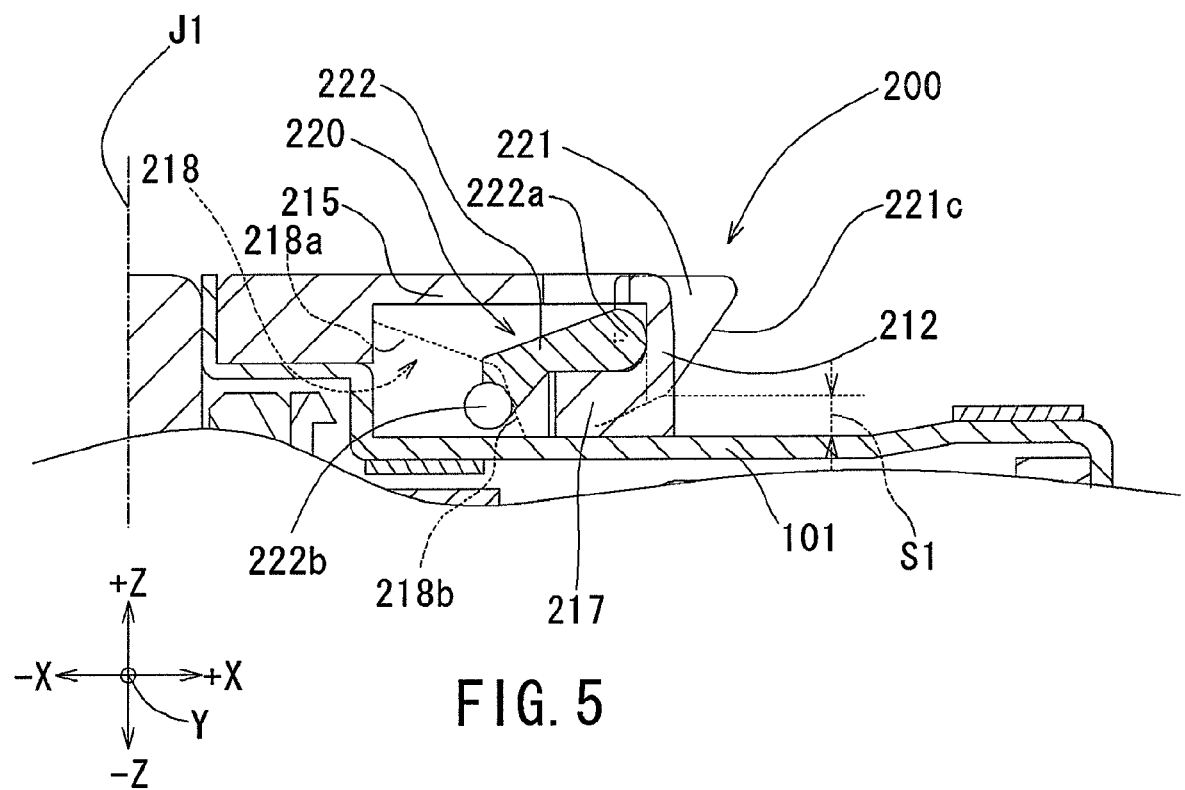
FIG. 5 is a cross sectional view of the chucking mechanism before a disk makes contact therewith.

Hereinafter, the chucking mechanism 200 according to a preferred embodiment of the present invention will be described with reference to FIGS. 2 through 5. FIG. 2 is a plan view of the chucking mechanism 200 according to the present preferred embodiment of the present invention. FIG. 3a is a schematic cross sectional view in the axial direction of the center case 210 according to the present preferred embodiment of the present invention. FIG. 3b is a plan view of the center case 210 according to the present preferred embodiment of the present invention. FIG. 4a is a schematic side view of a claw member 220 according to a preferred embodiment of the present invention. FIG. 4b is a schematic front view of the claw member 220 according to the present preferred embodiment of the present invention. FIG. 4c is a plan view of the claw member 220 according to the preferred embodiment of the present invention. FIG. 5 is an enlarged schematic cross sectional view of the chucking mechanism 200 according to a preferred embodiment of the present invention.

According to FIG. 2, the chucking mechanism 200 preferably includes the center case 210 preferably having a substantially cylindrical shape concentric with the central axis J1, and the rotor holder 100 (i.e., turn table) having the disk setting portion 101b. The disk setting portion 101b set on the rotor holder 100 is preferably made of a material excellent in coefficient of friction.

The center case 210 preferably includes at an outer circumference thereof a plurality of aligning claws 221 for aligning a central opening portion of the disk with the central axis J1, a plurality of claw members 220 arranged so as to contact with the inner circumferential surface of the central opening of the disk. To be more specific, according to the preferred embodiment of the present invention, the chucking mechanism 200 preferably includes three aligning claws 221 and claw members 220 each are alternately arranged in the circumferential direction evenly apart from one another. Also, the center case 210 preferably includes an elastic member 230 which provides radial force for each claw member 220. The elastic member 230 according to the present preferred embodiment is a coil spring. Note that the elastic member 230 extends in the radial direction.

According to FIGS. 3a and 3b, the center case 210 preferably includes a cylindrical portion 212, a guiding portion 213 arranged axially above the cylindrical portion 212 for guiding the disk to the cylindrical portion 212, a base portion 214 for connecting the center case 210 with the rotor holder 100, and a top plate portion 215 connecting the guiding portion 213 and the base portion 214. Also, the center case 210 preferably includes at a portion between the cylindrical portion 212 and an outer edge of the top plate portion 215 an opening 216 for each claw member 220. Note that the center case 210 is made by an injection molding and made of a resin material and as a single component.

The opening 216 preferably includes a side opening portion 216a opening toward the cylindrical portion 212 and the guiding portion 213, and an upper side opening portion 216b opening continuously upwardly from the side opening portion 216a. It is to be appreciated that a circumferential width of the side opening portion 216a is greater than that of a claw portion 221 (described later) of the claw member 220, and is smaller than that of the claw member 220 including a pair of movement support portions 222 (described later). Also, the side opening portion 216a penetrates to a bottom surface of the cylindrical portion 212. Also, a circumferential width of the upper side opening portion 216b is greater than that of the claw portion 221, and is smaller than that of the claw member 220 including a pair of movement pivot portions 222a (described later) of the movement support portions 222. Also the upper side opening portion 216b includes a widened portion 216b1 whose circumferential width is equal to or greater than that of a pair of movement pivot receiving portions 217 (described later) circumferentially binding the claw portion 221. Also, the circumferential width of the widened portion 216b1 is smaller than that of a pair of upper side contact surfaces 222a2 (described later) of the movement support portion 222. Also, the radial width of the widened portion 216b1 is equal to or greater than that of the movement pivot receiving portion 217.

The top plate portion 215 preferably includes at a position corresponding to both sides in the circumferential ends of the widened portion 216b1 a lower side receiving surface 215a which restricts a radial movement of the claw member 220 by making contact with the upper side contact surface 222a2.

The cylindrical portion 212 preferably includes at both sides in the circumferential direction of the side opening portion 216a a movement pivot receiving portion 217 which preferably includes a plane surface extending substantially perpendicularly to the central axis J1, and makes contact with the movement pivot portion 222a. The movement pivot receiving portion 217 extends further radially inwardly than a radial position of the movement pivot portion 222a when the claw member 220 is at a radially innermost position. Also, the movement pivot receiving portion 217 is connected to the cylindrical portion 212. Also, at a portion connecting the movement pivot receiving portion 217 and the cylindrical portion 212 a curved surface 217a having an indent surface is arranged. It is to be appreciated that the forming of the widened portion 216b1 allows a configuration of a mold used to form the center case 210 to be simple. In particular, the mold used to form the center case 210, which is a single component, includes an upper mold, which slides, and a lower mold, which is fixed, wherein the upper mold is removed from the lower mold in a simple manner.

The base portion 214 includes a plane surface which is perpendicular to a direction in which the elastic member 230 extends and which makes contact with the elastic member 230. The plane surface includes a movement restricting indent portion 214a which is equal to or slightly greater than a diameter of the elastic member 230 which is a spring. The movement restricting indent portion 214a restricts a movement of the elastic member 230 in the circumferential direction. By virtue of such configuration, when a radial force acting toward the central axis is applied (i.e., when the disk is placed on the chucking mechanism 200) to the claw member 220, the force is not dispersed in the circumferential direction, and therefore, the chucking mechanism 200 allows the disk to be set thereon smoothly.

Also, the base portion 214 preferably includes at a portion connecting the movement restricting indent portion 214a and the top plate portion 215 a lower contact surface 214b which restricts, by making contact with the elastic member 230, an axial movement of the elastic member 230. The lower contact surface 214b is arranged axially below a bottom surface of the top plate portion 215. Also, the lower contact surface 214b is substantially parallel with the bottom surface of the top plate portion 215. Also the lower contact surface 214b and the top plate portion 215 are connected to one another by a surface which is parallel with the central axis J1. Also, since the lower contact surface 214b which is arranged axially below the top plate portion 215 substantially prevents the elastic member 230 from making contact with the top plate portion 215. By virtue of such configuration, when the radial force acting toward the central axis is applied to the claw member 220, the force is not dispersed in the axial direction, and therefore, the chucking mechanism 200 allows the disk to be set thereon smoothly.

A movement support receiving portion 218 having two surfaces each having an inclination different from one another is formed radially inward of the movement pivot receiving portion 217. The movement support receiving portion 218 includes an upper movement support surface 218a which is connected to the top plate portion 215 and which is inclined such that the further radially outward a portion thereof is the axially lower the portion is, and a lower movement support surface 218b which is arranged radially outwardly and axially lower and which is inclined such that the further radially outward a portion thereof is the axially lower the portion is. A curved surface 218c is arranged protrudingly in the substantially radially outward direction at a portion connecting the upper movement support surface 218a and the lower movement support surface 218b. Also, the curved surface 218c is formed such that an angle θ2 defined by the upper movement support surface 218a and the central axis J1 is greater than an angle θ1 defined by the lower movement support surface 218b and the central axis J1. The angle θ1 may be designed such that the movement assist portion 222b will be restricted from moving in the radially inward direction. By virtue of such configuration, the disk guiding surface 221a is allowed to remain inclined radially outwardly and axially downwardly while moving on to the upper movement support surface 218a. Also, at the upper movement support surface 218a on which the claw member 220 moves in the radial direction, an axial movement of the tip portion 221b will be supported. Also, at the upper movement support surface 218a, the radial movement of the claw member 220 will be supported effectively. Therefore, the disk will be set on the chucking mechanism 200 effectively.

Also, since the movement pivot receiving portion 217 is arranged radially inside of the cylindrical portion 212, when the movement pivot portion 222a makes contact with an inner circumferential surface of the cylindrical portion 212, a mechanism to restrict the claw member 220 from moving exceedingly in the radial direction is formed. Therefore, a separate mechanism for restricting the radial movement of the claw member 220 will not be necessary. Further, the radial length of the movement pivot receiving portion 217 is freely determined within a distance between the inner circumferential surface of the cylindrical portion 212 and the base portion 214 in accordance with the radial movement of the claw member 220.

Also, the radial length of the movement support receiving portion 218 is freely determined within the distance between the inner circumferential surface of the cylindrical portion 212 and the base portion 214 in accordance with the radial movement of the claw member 220. Also, since the movement support receiving portion 218 and the movement pivot receiving portion 217 are arranged such as not to overlap in the radial direction with one another, the movement of the movement pivot receiving portion 217 will not be in the way of the movement support receiving portion 218 or vice-versa. Therefore the movement pivot receiving portion 217 and the movement support receiving portion 218 each will be designed in accordance with their movement.

Also, the lower side receiving surface 215a is arranged between the movement pivot receiving portion 217 and the movement support receiving portion 218 in the circumferential direction.

The aligning claw 211 includes an aligning surface 211a which makes contact with the central opening portion of the disk (shown in FIGS. 3a and 3b) so as to align the disk, and a guiding inclined surface 211b which guides the disk to the aligning surface 211a. The guiding inclined surface 211b includes a portion thereof which is arranged axially below the guiding portion 213. That is a portion radially inward of the cylindrical portion 212 of the guiding inclined surface 211b makes no contact with the disk. That is, a portion radially outward of the cylindrical portion 212 guides the disk to the aligning surface 211.

According to FIGS. 4a to 4d, the claw member 220 includes the claw portion 221 and the pair of movement support portions 222 arranged on circumferentially both sides of the claw portion 221. The movement support portion 222 supports the axial movement of the claw member 220.

The claw portion 221 includes the disk guiding surface 221a which makes an initial contact with the disk when the disk is set on the chucking mechanism 200, a tip portion 221b which is formed continuously toward the axially lower direction from the disk guiding surface 221a and radially outwardly, and a disk retaining surface 221c which is formed continuously toward the axially lower direction from the tip portion 221b and retains the disk.

The disk guiding surface 221a guides the disk to the disk retaining surface 221c. Also, the disk guiding surface 221a is a plane surface having no inclination. The disk retaining surface 221c includes an inclined surface which is inclined such that the further radially outward a portion thereof is the axially upper the portion is, and which makes contact with an upper end of the central opening portion of the disk when the disk is set on the disk setting surface 101b. Here, the disk guiding surface 221a is arranged axially above the bottom surface of the top plate portion 215 before the disk is set on the chucking mechanism 200. Since the disk guiding surface 221a is a plane surface having no inclination, an axial length of the claw portion 221 is minimized. Consequently, the chucking mechanism 200 can be designed having a reduced axial thickness.

Also, mirror polishing which allows the disk to travel smoothly to the disk retaining surface 221c is applied on the disk guiding surface 221a and the disk retaining surface 221c. By virtue of such configuration, the disk can be attached to and detached from the chucking mechanism 200.

According to FIG. 4d, the claw portion 221 includes at the inner circumferential surface a protrusion 221d protruding radially inwardly so as to make contact with the elastic member 230. The protrusion 221d includes at an upper portion thereof a protrusion inclined surface 221d1 which is inclined such that the further radially inward a portion thereof is the axially lower the portion is. Also, the claw portion 221 includes at a radially inner surface and a bottom portion thereof an inner circumferential surface side inclined surface 221d2 which is inclined such that the further radially outward a portion thereof is the axially lower the portion is. A diameter of an area connecting the protrusion 221d and the inner circumferential surface of the claw member 221 is substantially equal to a diameter of the elastic member 230 (i.e., an inner diameter of the coil spring). By virtue of such configuration, the elastic member 230 will substantially be prevented from moving in the axial direction and in the circumferential direction, and therefore, the radial force of the elastic member 230 is effectively provided to the claw portion 221.

Figure 18:
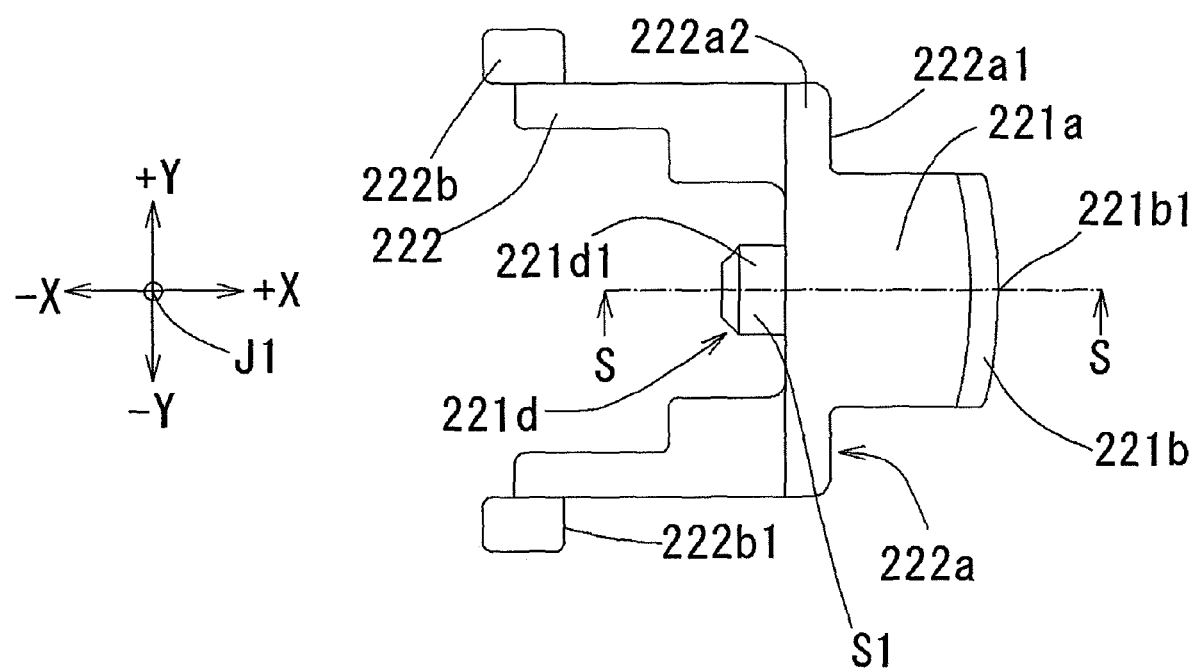
FIG. 18 is an enlarged view of the plan view of the claw member of the present invention shown in FIG. 4c.
Figure 19:
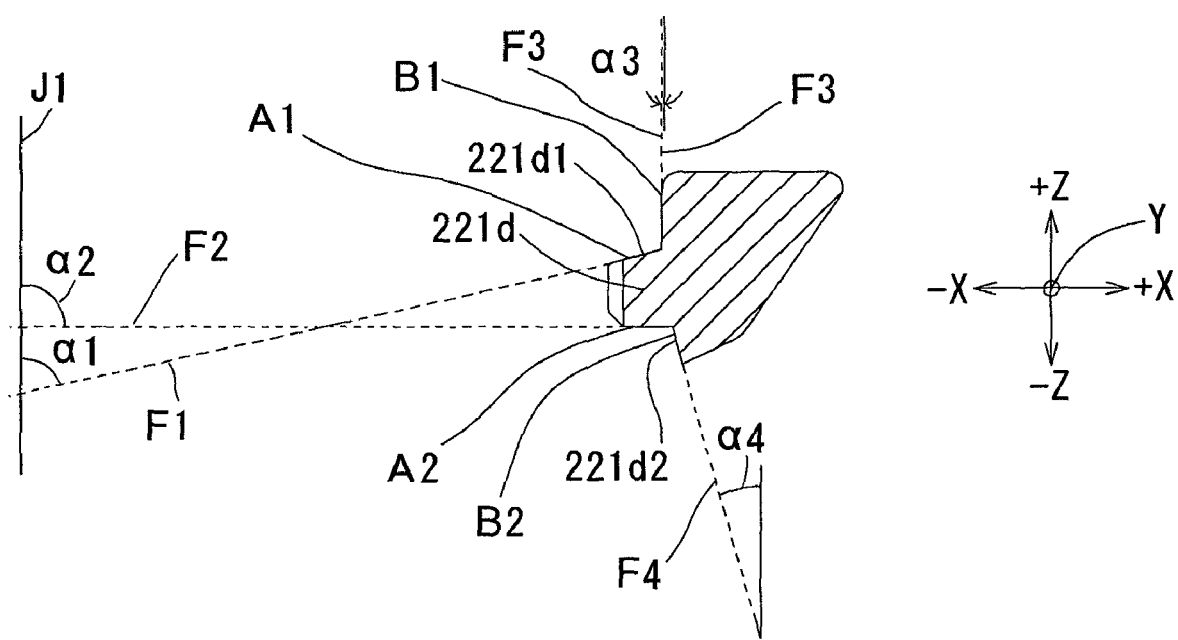
FIG. 19 is an enlarged view of the schematic cross sectional view of the claw member of the present invention as shown in FIG. 4d.

The pair of movement support portions 222 attached to the claw portion 221 are extending radially inwardly from a radially inner circumferential side of the claw portion 221. Also, the movement support portion 222 includes the movement pivot portion 222a which is a pivotal portion of the movement of the claw member 220, and the movement assist portion 222b which is arranged radially inward of the movement pivot portion 222a and guides the claw member 220 in the radial direction. Also, the movement support portion 222 includes at a surface thereof which is connected to the upper side contact surface 222a2 and which is inclined such that the further radially a portion thereof is the axially lower the portion is. By virtue of such inclined surface, when the tip portion 221b of the claw member 220 moves axially downwardly, the movement support portion 222 makes no contact with the top plate portion 215. As described in FIGS. 18 and 19 (derived from FIGS. 4c and 4d, respectively), the claw member 220 has a cross-section running through the central axis J1 and a midpoint 221b1 of a circumferential width of the tip portion 221b. As described in FIG. 18, line S-S runs through the central axis J1 of the center case 210 of the chucking mechanism 200. As described in FIG. 18, the claw member 220 has the protrusion 221d extending radially inward. As described in FIG. 19, the protrusion 221d has a surface S1 which fits one end of the coil spring 230, the surface S1 having an upper protrusion inclined surface part A1 and a lower protrusion inclined surface part A2. As described in FIG. 19, line F1 extended from the upper protrusion inclined surface part A1 has angle α1 with respect to the central axis J1 in the cross-section shown therein. As described in FIG. 19, line F2 extended from the lower protrusion inclined surface part A2 has angle α2 with respect to the central axis J1 in the cross-section. As described in FIG. 19, angle α1 is smaller than angle α2. In addition, As described in FIG. 19, the cross-section of the claw member 220 has an upper inner surface part B1 upwardly extended from the upper protrusion inclined surface part A1 and a lower inner surface part B2 downwardly extended from the lower protrusion inclined surface part A2. As described in FIG. 19, line F3 extended from the upper inner surface part B1 has angle α3 with respect to the central axis J1 in the cross-section, and line F4 extended from the lower inner surface part B2 has angle α4 with respect to the central axis J1 in the cross-section. As described in FIG. 19, angle α3 is smaller than angle α4.

The movement pivot portion 222a preferably includes a movement pivot side curved surface 222a1 which slides with a top surface of the movement pivot receiving portion 217. The movement pivot side curved surface 222a1 needs at least enough curve to allow the tip portion 221b to move in the axial direction. In particular, the movement pivot side curved surface 222a1 of the movement pivot portion 222a has preferably an even curvature radius. By virtue of such configuration, only the tip portion 221b of the claw member 220 is allowed to move in the axial direction.

Also, the movement pivot portion 222a preferably includes at a portion extending radially inwardly from a bottom end surface of the movement pivot side curved surface 222a1 an extending plane surface 222c. The extending plane surface 222c is a plane surface which is substantially parallel with the top surface of the movement pivot receiving portion 217 when the claw member 220 is contained within the center case 210.

Also, the pair of movement assist portions 222b are arranged substantially on circumferential sides of the claw member 220 preferably including the pair of movement support portions 222. Also, a surface of the movement assist portion 222b opposed to the movement support receiving portion 218 preferably includes a movement support portion side curved surface 222b1 which protrudes toward the movement support receiving portion 218. The movement support portion side curved surface 222b1 is a curved surface which allows the claw member 220 to slide with the upper movement support surface 218a and the lower movement support surface 218b.

A configuration of the chucking mechanism 200 prior to when the disk (not shown in FIG. 5) is set thereon will be described with reference to FIG. 1 and FIG. 5. FIG. 5 is a cross sectional view of the chucking mechanism 200 before the disk makes contact therewith.

According to FIG. 5, the claw portion 221 protrudes radially outwardly from the opening 216 of the center case 210. Also, the elastic member 230 is compressed and contained within the center case 210. The elastic member 230 is arranged between an outer circumferential surface of the base portion 214 and an inner circumferential surface of the claw portion 221. Also, the elastic member 230 makes contact with the protrusion 221d arranged at the inner circumferential surface of the claw portion 221. The compressed elastic member 230 provides a radial force to the claw portion 221 in the radially outward direction.

Next, according to FIG. 5, the movement pivot portion 222a of the movement support portion 222 makes contact with the inner circumferential surface of the cylindrical portion 212 so as to prevent the claw member 220 from moving excessively in the radially outward direction. Also, the movement pivot portion 222a makes contact with the top surface of the movement pivot receiving portion 217.

The movement pivot portion 222a preferably includes at the top surface thereof the upper side contact surface 222a2 operable to make contact with the bottom surface of the top plate portion 215. Prior to when the disk makes contact with the chucking mechanism 200, the upper side contact surface 222a2 is substantially opposed to the bottom surface of the top plate portion 215 via a minute gap in the axial direction. That is, since the upper side contact surface 222a2 is not in contact with the bottom surface of the top plate portion 215 prior to when the disk is set on the chucking mechanism 200, an area in which the claw member 220 and the center case 210 make contact with one another will be reduced. Also, when the tip portion 221b moves in the axially downward direction, the upper side contact surface 222a2 is not in contact with the top plate portion 215, the area in which the claw member 220 and the center case 210 make contact with one another will be reduced allowing the claw member 220 to move in the radially inward direction smoothly. By virtue of such configuration, the disk will be set on the chucking mechanism 200 smoothly.

Also, the movement assist portion 222b is arranged above the lid portion 101 via an axial gap. That is, an axial position of the claw member 220 is determined by the movement pivot portion 222a and the top surface of the movement pivot receiving portion 217. If the axial position of the claw member 220 is determined by the contact between the lid portion 101 and the movement assist portion 222b, an assembly error of the rotor holder 100 and the center case 210 will affect the axial position of the claw member 220. According to the present invention, however, the axial position of the claw member 220 is determined by the movement pivot portion 222a and the top surface of the movement pivot receiving portion 217, and therefore, is less likely to be affected by the assembly error. Therefore, the chucking mechanism 200 according to the present preferred embodiment of the present invention offers a reliable quality. Also note that the movement assist portion 222b is substantially opposed to the lower movement support surface 218b of the movement support receiving portion 218 via a minute gap.

It is to be noted that there is no extra component between the bottom surface of the disk retaining surface 221c and the top surface of the lid portion 101. That is, the side opening portion 216a extends to a bottom end portion of the cylindrical portion 212, and therefore, a space S1 which defines an axial space between the bottom surface of the disk retaining surface 221c and the top surface of the lid portion 101 is minimized while the claw portion 221 makes no contact with the top surface of the lid portion 101 when the claw portion 221 is at the lowest position in the axial direction. According to the present invention, the excessive movement of the claw member 220 in the axial direction is prevented by the movement pivot portion 222a and the movement pivot receiving portion 217, and therefore, it becomes possible to design the space S1 having a minimum space and a preferable accuracy. By virtue of such configuration, it becomes possible to design the chucking mechanism 200 having a preferable thinness.

According to FIG. 1, it is preferable that the base portion 214 of the center case 210 is arranged to reach in the axial direction a central portion in the axial direction of the elastic member 230, or more preferably below in the axial direction of the elastic member 230. By virtue of such configuration, the center case 210 is operable to contain and affix to the rotor portion (e.g., rotor holder 100, rotor magnet 110 and shaft 90) the claw member 220 and the elastic member 230. Therefore, the chucking mechanism 200 will be assembled with facility and a productivity of the brushless motor will be improved.

Movement of Claw Member

Figure 6:
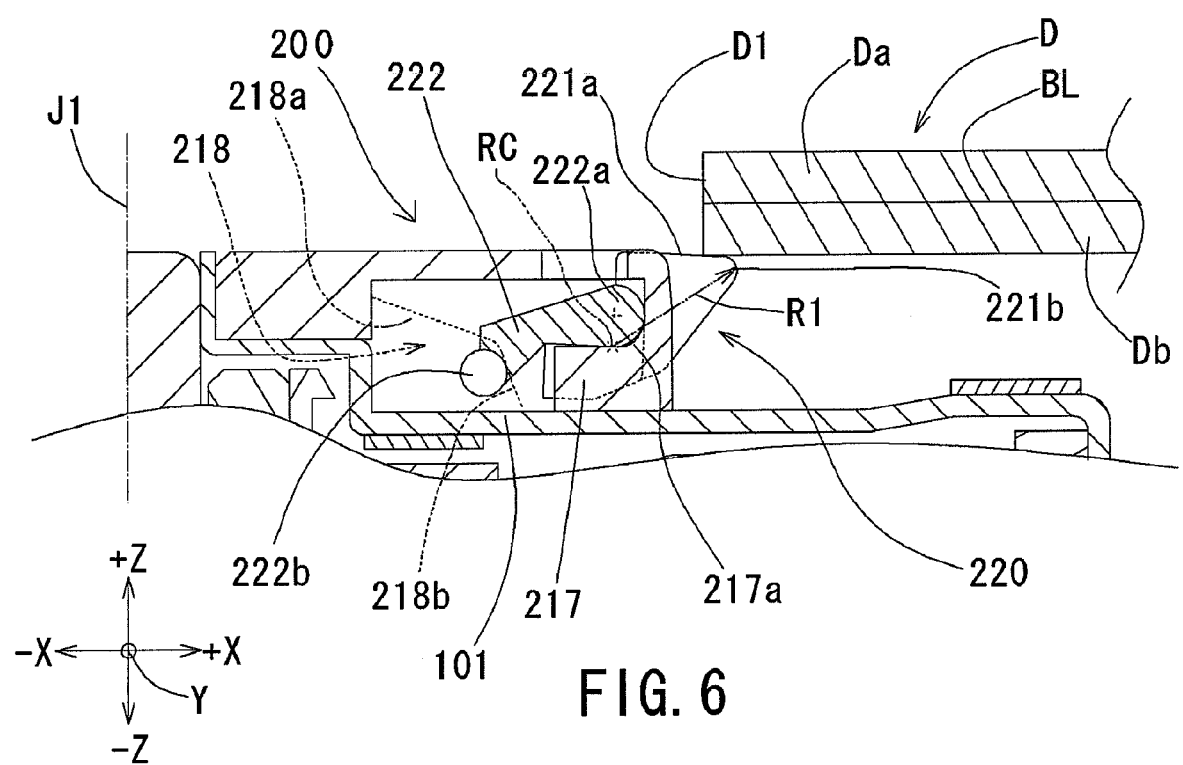
FIG. 6 is a cross sectional view of the chucking mechanism when the disk begins to make contact with a disk guiding surface.
Figure 7:
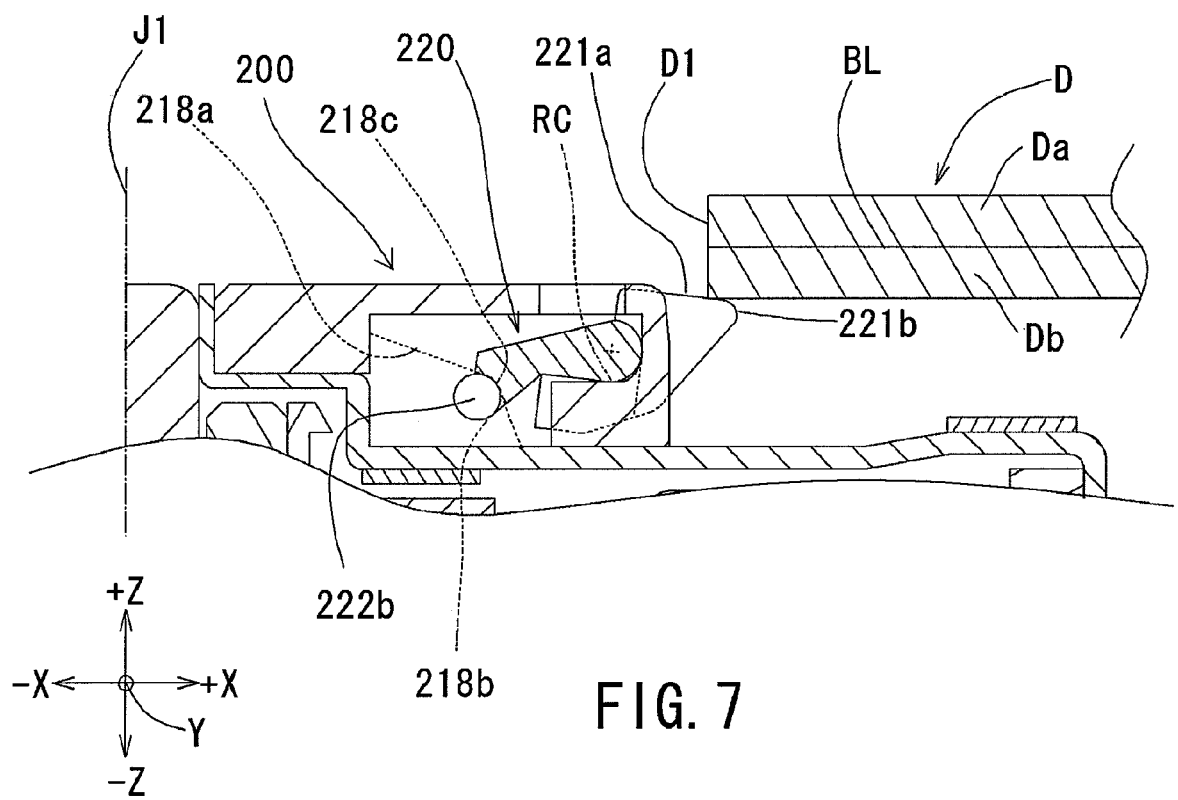
FIG. 7 is a cross sectional view of the chucking mechanism according to the present invention in which a movement support portion is arranged at a position of a curved surface.
Figure 8:
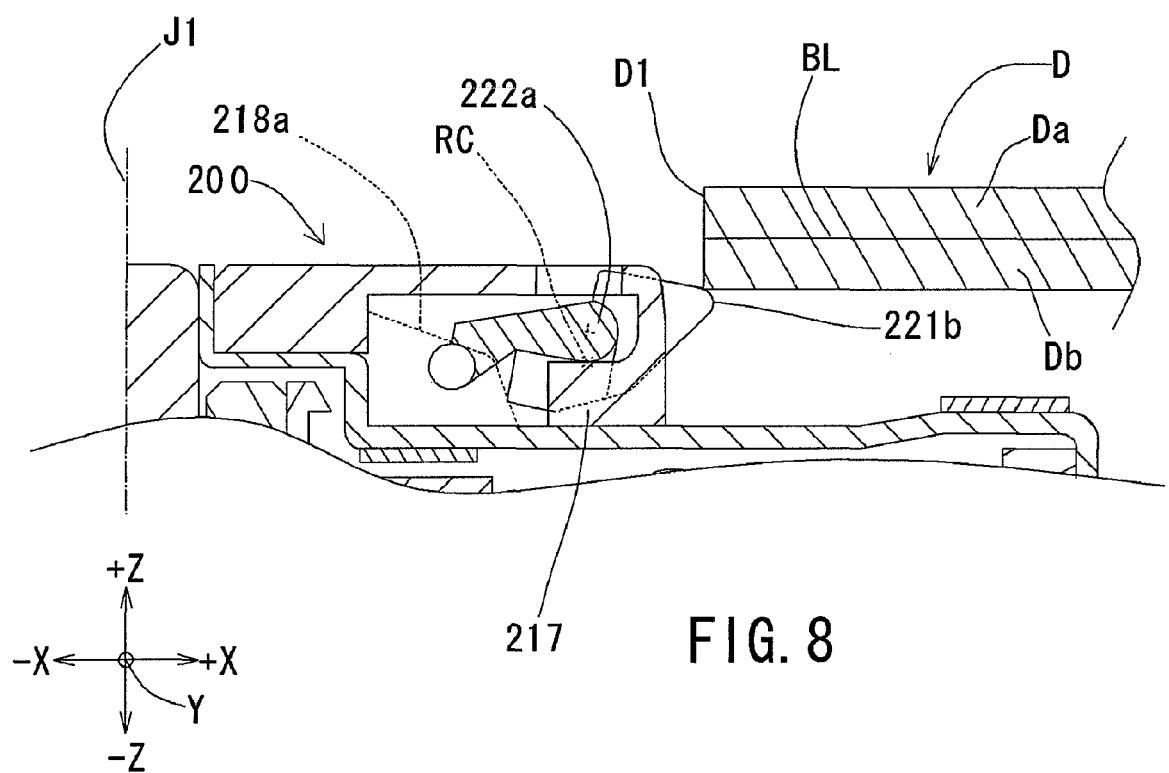
FIG. 8 is a cross sectional view of the chucking mechanism according to the present invention in which the movement support portion slides over an upper movement support surface.
Figure 9:
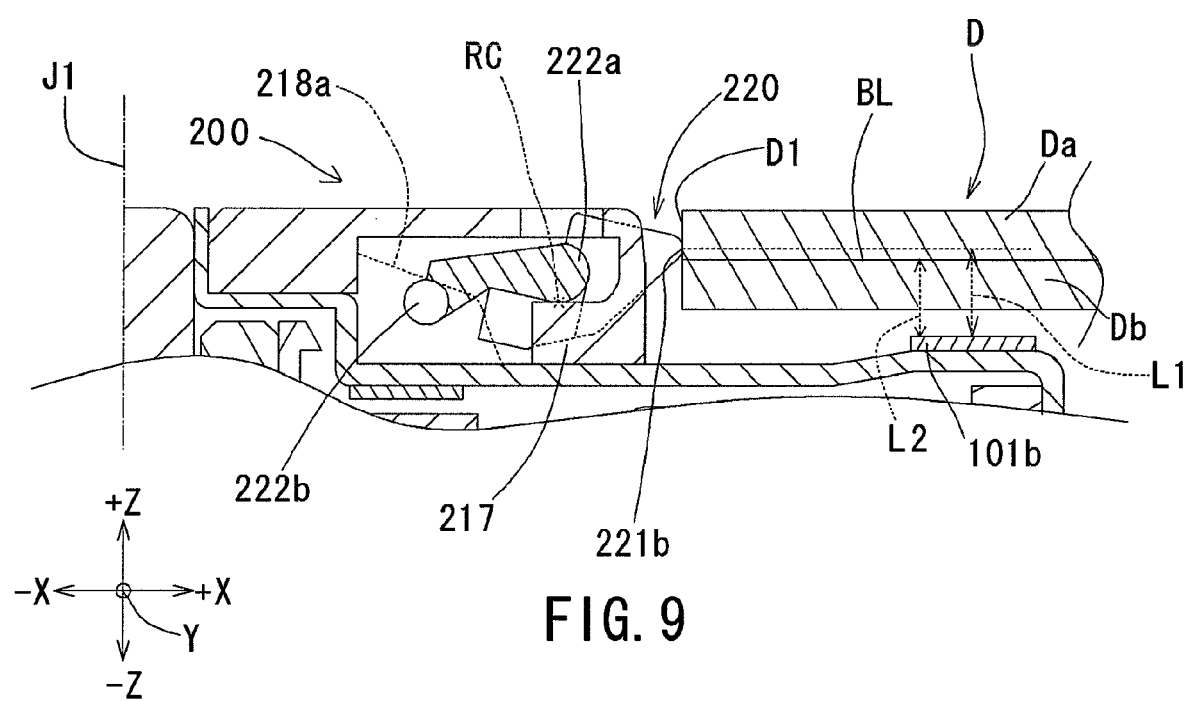
FIG. 9 is a schematic cross sectional view of the chucking mechanism according to the present invention in which a tip portion thereof is at an axially lowest position.
Figure 10:
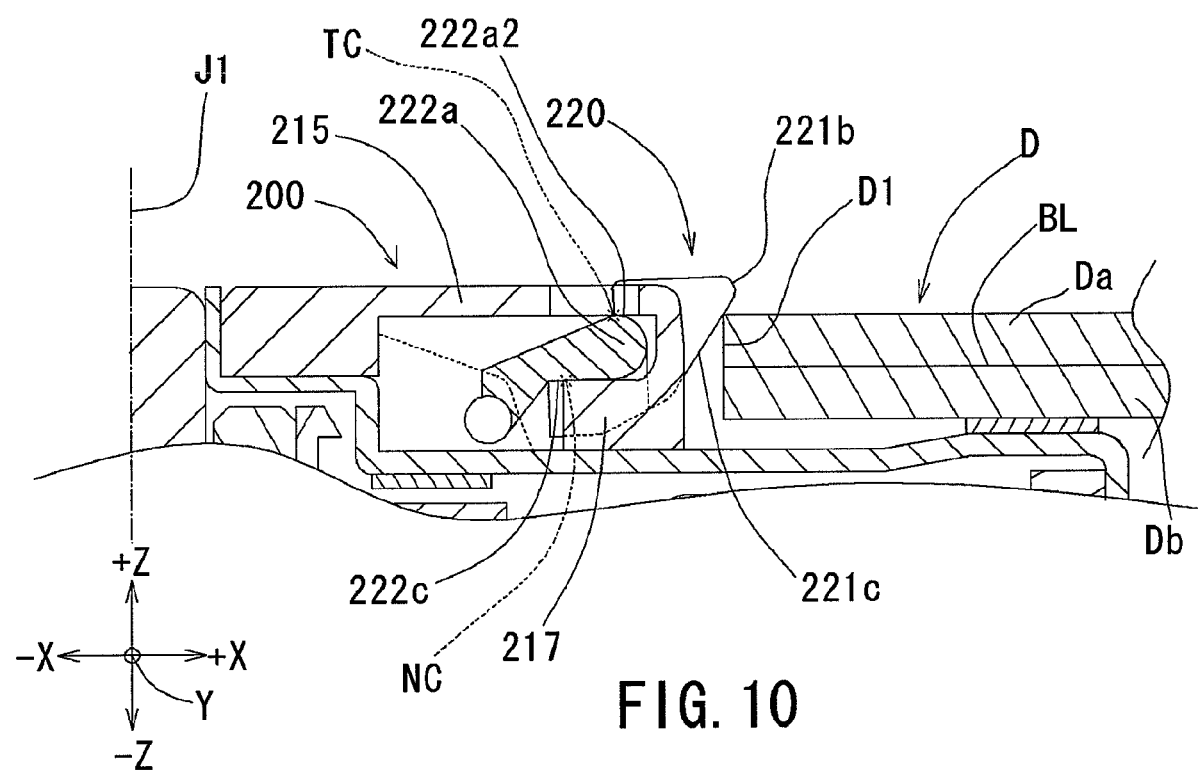
FIG. 10 is a schematic cross sectional view of the chucking mechanism according to the present invention in which the claw member retains the disk.
Figure 11:
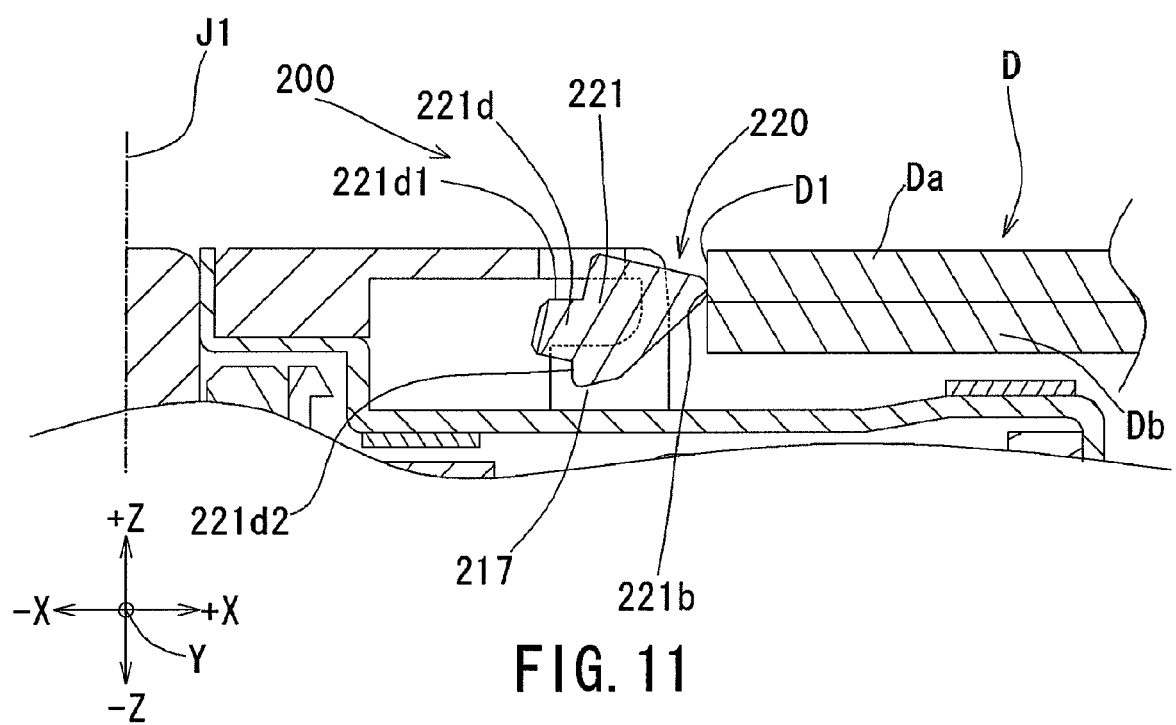
FIG. 11 is a cross sectional view of the chucking mechanism according to the present invention in which an inner configuration of the claw portion according to FIG. 9 is shown.

Hereinafter, movement of the claw member 220 when a disk D is set on the chucking mechanism 200 will be described with reference to FIG. 6 through FIG. 11. FIG. 6 is a cross sectional view of the chucking mechanism 200 when the disk D begins to make contact with the disk guiding surface 221a. FIG. 7 is a cross sectional view of the chucking mechanism 200 according to the present invention in which the movement assist portion 222b is arranged at a position of a curved surface 218c. FIG. 8 is a cross sectional view of the chucking mechanism 200 according to the present invention in which the movement assist portion 222b slides over the upper movement support surface 218a. FIG. 9 is a schematic cross sectional view of the chucking mechanism 200 according to the present invention in which the tip portion 221b thereof is at the axially lowest position. FIG. 10 is a schematic cross sectional view of the chucking mechanism 200 according to the present invention in which the claw member 220 retains the disk D. FIG. 11 is a cross sectional view of the chucking mechanism 200 according to the present invention in which an inner configuration of the claw portion 221 according to FIG. 9 is shown. Hereinafter, the disk D is a multi-layered disk including an upper disk Da and a lower disk Db wherein the disk Da is pasted to the disk Db via an adhesive. Note that the elastic member 230 is omitted from FIGS. 6 through 10 in order to better show a relationship between the claw member 220 and the center case 210.

According to FIG. 6, a central opening portion D1 of the disk D makes contact with the disk guiding surface 221a. Then, the tip portion 221b of the claw member 220 moves in the axially downward direction. The movement of the claw member 220 is supported via a movable support point RC which is a point at which the movement pivot portion 222a makes contact with the movement pivot receiving portion 217. Here, a moving radius R1 of the claw member 220 in the axially downward direction equals a distance between the movable support point RC and the tip portion 221b, and therefore, when the movable support point RC is arranged far from the tip portion 221b, the moving radius R1 can be increased. Consequently, a rotational force applied to the claw member 220 in the axially downward direction is reduced, which also reduces the force required to set the disk D on the chucking mechanism 200. That is, the chucking mechanism 200 allows the disk D to be set thereon smoothly.

The movement assist portion 222b moves axially upward when the tip portion 221b moves axially downward. Also, when the movement assist portion 222b moves upward in the axial direction slightly, the movement assist portion 222b makes contact with and slides on the lower movement support surface 218b. At this point, the claw member 220 moves radially inwardly along the lower movement support surface 218b. Also, when the tip portion 221b of the claw member 220 moves in the axially downward direction, the axial gap between the movement support portion 222 and the lid portion 101 is gradually increased.

Next, according to FIG. 7, the movement assist portion 222b moves to the position of the curved surface 218c. At this point, the movement assist portion 222b makes contact with both the lower movement support surface 218b and the upper movement support surface 218a. At the position of the curved surface 218c, the claw member 220 begins to move substantially in the radial direction. Here, since the tip portion 221b is already moving in the axially downward direction, the claw member 220 is allowed to move in the radial direction while an angle defined by the top surface of the disk guiding surface 221a and the central axis J1 remains large. Therefore, when the disk D is being set on the chucking mechanism 200, a great amount of force pushing the claw member 220 in the axially downward direction will not be required.

Next, according to FIG. 8, when the disk D moves further downward in the axial direction, the movement assist portion 222b makes contact with the upper movement support surface 218a since the claw member 220 moves radially inwardly. The force applied to the disk D to set the disk D on the chucking mechanism 200 is, because of the inclined surface of the upper movement support surface 218a, shifted to the radially inward direction. Also, the tip portion 221b moves axially in the downward direction along the inclination of the upper movement support surface 218a.

The movement pivot portion 222a moves radially inward by sliding on the surface of the movement pivot receiving portion 217. Here, since the top surface of the movement pivot receiving portion 217 is arranged perpendicularly to the central axis J1, the claw member 220 will not be forced to move axially downwardly due to the force to set the disk D on the chucking mechanism 200. The claw member 220 is allowed to move radially inwardly.

Next, according to FIG. 9, when the claw member 220 is at the radially innermost point (i.e., when the tip portion 221b makes contact with the inner circumferential surface of the central opening portion D1 of the disk D), the tip portion 221b is at the axially lowest point. The point at which the tip portion 221b is determined by the way in which the movement assist portion 222b and the upper movement support surface 218a make contact with one another. Also, when the tip portion 221b is at the lowest point in the axial direction as shown in FIG. 9, an axial height (L1) of the tip portion 221b from the disk setting surface 101b is greater than an axial height (L2) which is an axial length between the disk setting surface 101b having set thereon the disk D and a line (BL) bordering the disk Da and the disk Db. Since the L1 is axially above the BL from the disk setting surface 101b, a chucking failure in which the tip portion 221b interferes with the BL.

The movement pivot portion 222a slides over the top surface of the movement pivot receiving portion 217. Note that the top surface of the movement pivot receiving portion 217 extends radially inwardly further than an innermost point to which the movement pivot portion 222a reaches. Therefore, an entire sequence of radial movement of the claw member 220 will be conducted over the movement pivot portion 222a and the movement pivot receiving portion 217. Since the claw member 220 is allowed to move substantially only in the radial direction, the elastic member 230 will not be deformed which may happen when the claw member 220 moves in the axial direction. By virtue of such configuration, the disk D will be set on the chucking mechanism 200 smoothly.

Also, when the tip portion 221b is at the axially lowest point as shown in FIG. 9, the protrusion inclined surface 221d1 which is arranged at the upper portion of the protrusion 221d and is a mechanism to prevent the elastic member 230 from being deformed in the axial direction becomes substantially perpendicular to the central axis J1 (see FIG. 11). The inner circumferential surface side inclined surface 221d2 which is arranged at the radially inner surface and the bottom portion of the claw portion 221 becomes substantially parallel to the central axis J1. By this, when the claw member 220 is at the axially lowest point, the protrusion inclined surface 221d1 is operable to substantially prevent the protrusion 221d from interfering with the elastic member 230. Also, when the claw member 220 is at the axially lowest point, the inner circumferential surface side inclined surface 221d2 is operable to prevent the elastic member 230 from moving upward in the axial direction, substantially preventing deformation thereof. Consequently, the elastic member 230 is allowed to provide the radial force to the claw portion 221 without being interfered by the top plate portion 215.

It is to be noted that when the protrusion inclined surface 221d1 is as shown in FIG. 9, the protrusion inclined surface 221d1 is not limited to being substantially perpendicular to the central axis J1. The protrusion inclined surface 221d1 can be designed such that the further radially inward a portion thereof is the axially lower the portion is when the tip portion 221b is at the axially lowest point as shown in FIG. 9.

Next, according to FIG. 10, the tip portion 221b slides along the inner circumferential surface of the central opening portion D1 of the disk D in the axial upward direction and reaches the top end of the central opening portion D1. Then the disk D is retained by the claw member 220.

Also, while the disk D is retained by the claw member 220, the extending plane surface 222c makes contact with the top surface of the movement pivot receiving portion 217. A point (hereinafter, referred to as a support point NC) at which the extending plane surface 222c makes contact with the top surface of the movement pivot receiving portion 217 will function as a fulcrum via which the claw member 220 moves in the axially upward direction. Then, at a contact point TC, the upper side contact surface 222a2 of the movement support portion 222 makes contact with the bottom surface of the top plate portion 215. At the contact point TC, the claw member 220 is prevented from moving excessively upward in the axial direction when the disk D is removed from the chucking mechanism 200. By virtue of such configuration, an angle defined by the disk retaining surface 221c and a surface perpendicular to the central axis J1 will be kept at an optimal degree so as to securely retain the disk D. Also, since the extending plane surface 222c and the movement pivot receiving portion 222a make contact with one another, and the upper side contact surface 222a2 and the bottom surface of the top plate portion 215 make contact with one another, the tip portion 221b of the claw member 220 is substantially prevented from moving in the axially upward direction, while the axial movement of the claw member 220 is executed within an axial space between the movement pivot receiving portion 217 and the top plate portion 215. By virtue of such configuration, the movement of the claw member 220 will be controlled within an allowable error of assembling the center case 210, and therefore, a reliable chucking mechanism will be provided.

Also, the movement pivot receiving portion 217 includes a plane surface extending radially inwardly. Also, the extending plane surface 222c of the claw member 220 is substantially parallel with the movement pivot receiving portion 217, and therefore, substantially prevents the tip portion 221b of the claw member 220 from moving in the axially upward direction when the claw member 220 moves radially inwardly.

Axial Distance Between Tip Portion and Disk Setting Surface

Figure 12:
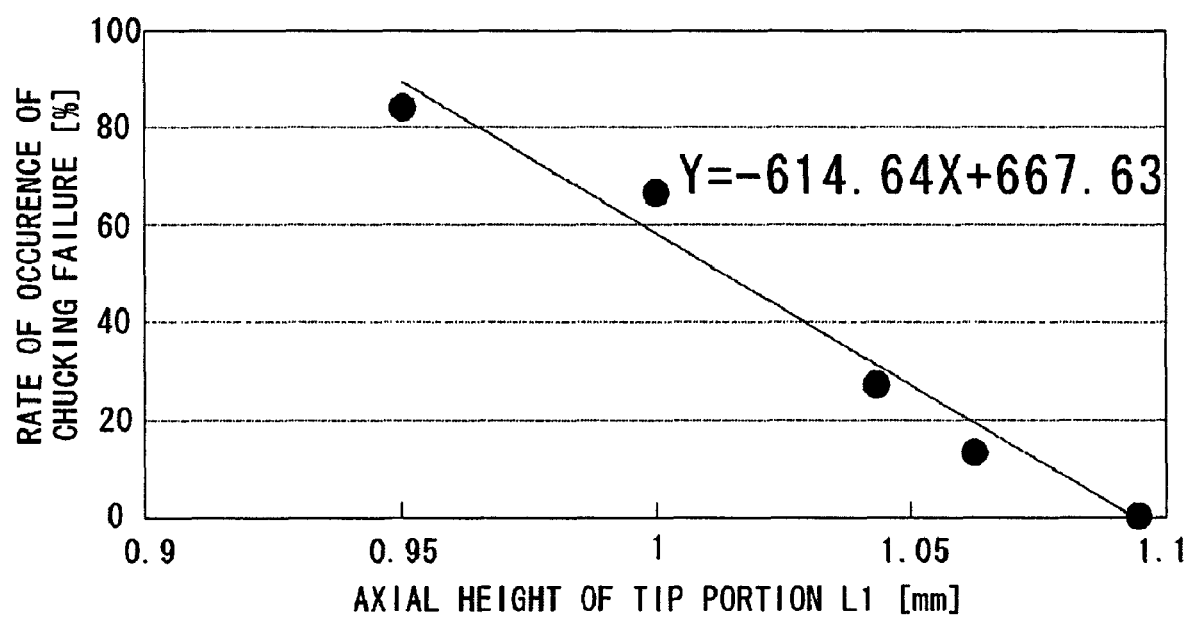
FIG. 12 is a graph indicating a correlation between a rate of occurrence of chucking failure and an axial height of a tip portion of the claw member of the chucking mechanism according to the present invention.

Hereinafter, an axial distance between the tip portion 221b of the claw portion 221 and the disk setting surface 101b will be described with reference to FIG. 12. FIG. 12 is a graph indicating a correlation between a rate of occurrence of chucking failure and axial height (hereafter, referred to as L1 shown in FIG. 9) of the tip portion 221b measured from the disk setting surface 101b when, for example, a Dual Disc which includes a CD and a DVD pasted to one another via adhesive is placed on the disk setting surface 101b with the CD side of the dual disc on the bottom. Note that the adhesive is not applied to an entire surface connecting the CD and the DVD. Also note that the vertical axis (Y) of the graph indicates the frequency (%) of the occurrence of the malfunction of the chucking mechanism 200 and the horizontal axis (X) indicates the value (mm) of L1.

According to FIG. 12, the greater the value of L1 is, the smaller the frequency of the occurrence of the malfunction of the chucking mechanism 200 becomes. When such relationship is numerically denoted, it is approximately: $Y=-614.64X+667.63$. That is, when Y is 0, no malfunction of the chucking mechanism occurs (i.e., when X equals approximately 1.08). Therefore, the value of L1 at which Y becomes 0 is the preferable value for L1. It is to be appreciated that the value X may change in accordance with the amount of adhesive used in the Dual Disc.

Figure 15:
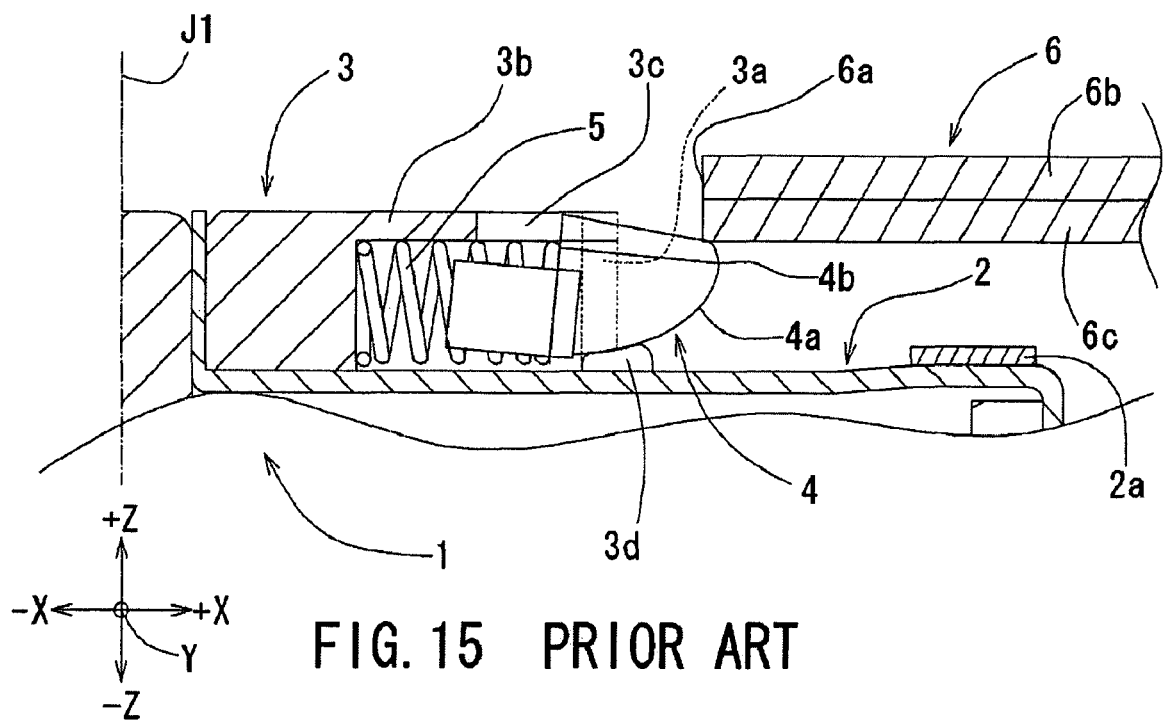
FIG. 15 is a cross sectional view of the conventional chucking mechanism when the disk begins to make contact with a claw member.
Figure 16:
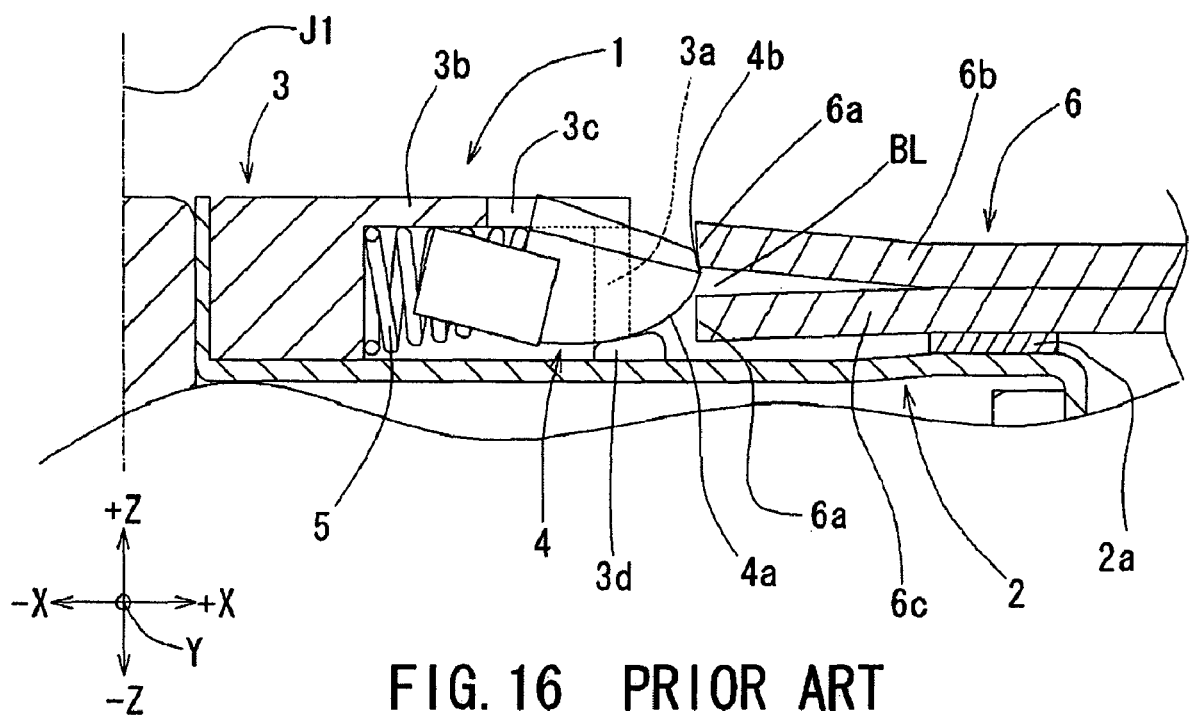
FIG. 16 is a cross sectional view of the conventional chucking mechanism in which a tip portion thereof is at an axially lowest position.

Hereafter, an axially downward movement of the claw member 4 when setting a disk 6 on a conventional chucking mechanism 1 will be described with reference to FIGS. 15 and 16. FIG. 15 is a cross sectional view of the conventional chucking mechanism 1 when the claw member 4 makes contact with a central opening portion 6a of the disk 6. FIG. 16 is a cross sectional view of the conventional chucking mechanism 1 in which the tip portion 4b thereof is at an axially lowest position. Note that the disk 6 is a multi-layered disk including an upper disk base 6b and a lower disk base 6c pasted to one another.

According to FIG. 15, the tip portion 4b of the claw member 4 moves axially downwardly when the claw member 4 makes, at a top surface thereof, contact with a bottom end of the central opening portion 6a, then the claw member 4 moves radially inwardly.

However, according to the conventional chucking mechanism 1, the axial position of the claw member 4 is lowered when the disk 6 makes contact therewith and the claw member 4 is at a radially innermost position inside a center case 3 (see FIGS. 15 and 16). That is, the tip portion 4b is also moved axially downward causing the tip portion 4b to be substantially at a line bordering between two disk bases 6b and 6c. By this, the chucking failure in which the tip portion 4b gets struck between the two disk bases 6b and 6c may occur.

However, according to FIG. 15, when the tip portion 4b moves in the axially downward direction a protrusion 4c moves in the axially upward direction causing the protrusion 4c to make contact with an inner circumferential surface of the coil spring 5. By such contact between the protrusion 4c and the coil spring 5, the coil 5 will be deformed in the axial direction and make contact with the center case 3.

On the other hand, the chucking mechanism 200 according to the present preferred embodiment of the present invention, since the protrusion 221d includes the protrusion inclined surface 221d1, even when the tip portion 221b moves in the axially downward direction there will be no contact between the protrusion 221d and the elastic member 230. By virtue of such configuration, the deformation of the elastic member 230 in the axial direction is minimized, and therefore the disk 6 will be set on the chucking mechanism 200 smoothly.

Disk Driving Apparatus

Figure 13:
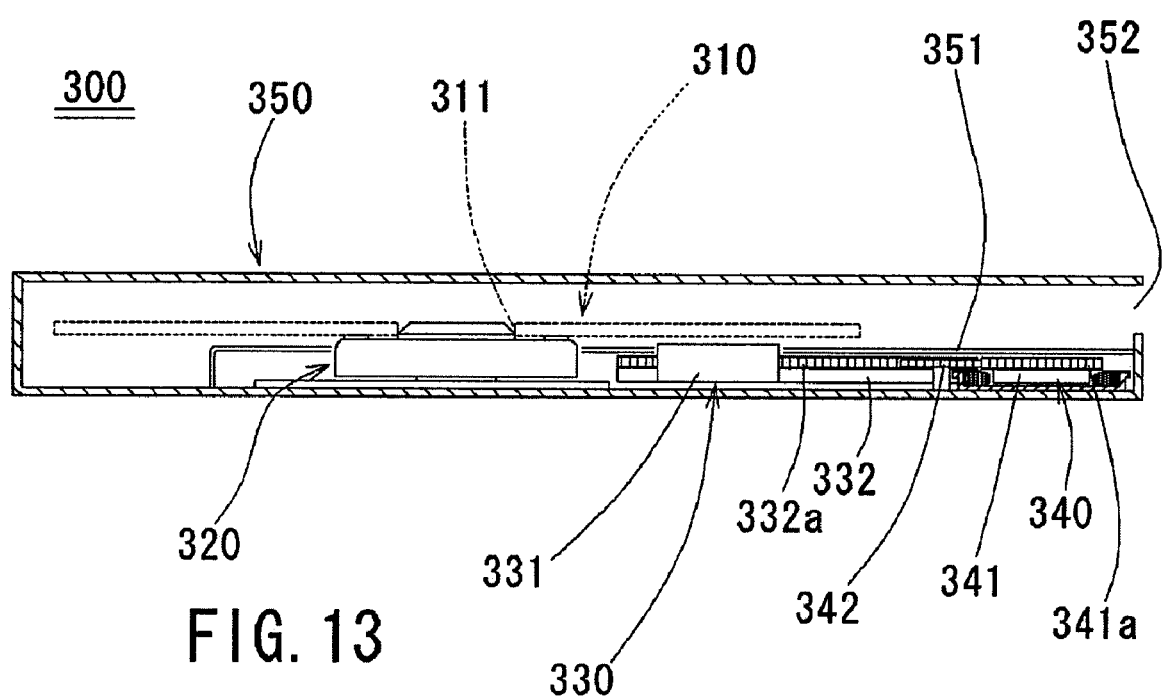
FIG. 13 is a cross sectional view of a disk driving apparatus according to a preferred embodiment of the present invention.
Figure 14:
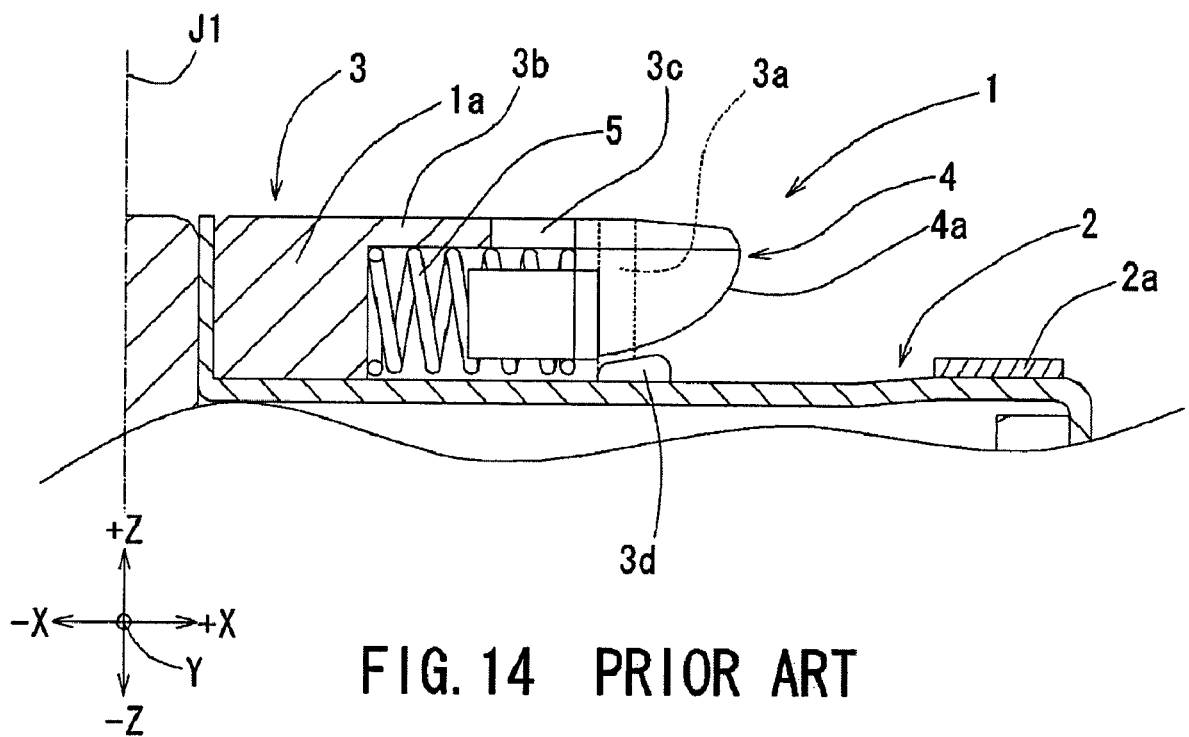
FIG. 14 is a cross sectional view of a conventional chucking mechanism before a disk makes contact therewith.

Hereinafter, a disk driving apparatus according to a preferred embodiment of the present invention will be described with reference to FIG. 13. FIG. 13 is a cross sectional view seen in the axial direction of the disk driving apparatus according to the present preferred embodiment of the present invention.

According to FIG. 13, a disk driving apparatus 300 preferably includes a brushless motor 320 which fits an opening 311 arranged at a center of a disk shaped disk 310 and rotates the disk 310 in a concentric manner, a pickup mechanism 330 which emits an optical light at the disk 310 in order to store data on the disk 310 and to reproduce data from the disk 310, a gear mechanism 340 which moves the pickup mechanism 330 in the radial direction with respect to the 310, and a housing 350 for accommodating therein the brushless motor 320, the pickup mechanism 330 and the gear mechanism 340.

The gear mechanism 340 includes a motor 341, and a torque receiving gear 342 which receives a rotary torque generated by the motor 341.

The housing 350 preferably includes a bordering plate 351 preferably made of a thin plate so as to divide the disk 310 and the gear mechanism 340. Also the housing 350 preferably includes an opening 352 through which the disk 310 will be inserted and rejected.

The pickup mechanism 330 preferably includes a storing/reproducing portion 331 which emits an optical light, and a moving portion 332 which is arranged vertically with respect to the moves the storing/reproducing portion 331. The moving portion 332 preferably includes an engaging portion 332a which engages with the torque receiving gear 342. The storing/reproducing portion 331 is engages with the moving portion 332 and is thereby allowed to move in the radial direction.

The torque receiving gear 342 rotates due to the engagement with a gear portion 341a which is attached to the motor 341. The moving portion 332 moves in the radial direction due to the engagement of the torque receiving gear 342 with the engaging portion 332a. Then, due to the moves of the moving portion 332, the storing/reproducing portion 331 moves in the radial direction.

Since the disk driving apparatus 300 includes the brushless motor 320 according to the present invention, the disk driving apparatus 300 is allowed to be thin while the disk 310 is set thereon smoothly, and retained thereby securely.

While the present invention has been described in detail, the foregoing description is in all aspects illustrative and not restrictive. It is understood that numerous other modifications and variations can be devised without departing from the scope of the invention.

For example, although the present preferred embodiment assumes that the movement support receiving portion 218 includes the upper movement support surface 218a and the lower movement support surface 218b, the present invention is not limited thereto; the movement support receiving portion 218 may only include the upper movement support surface 218a. When the movement support receiving portion 218 only includes the upper movement support surface 218a, the upper movement support surface 218a is preferably configured such as to allow the movement assist portion 222b to make a stable contact therewith.

For example, although the present preferred embodiment assumes that the disk D is a multi-layered disk, the present invention is compatible with a single layered disk.

Figure 17:
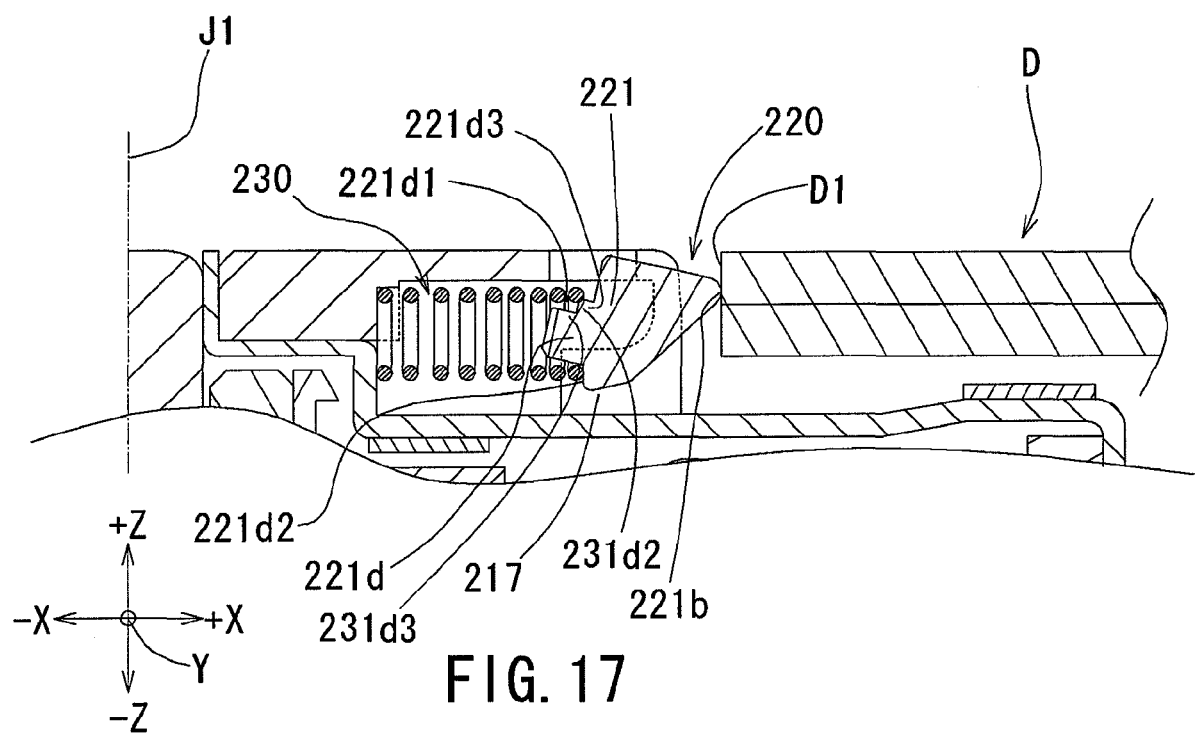
FIG. 17 is a cross sectional view showing a relationship between the claw portion and the elastic member.

For example, although the present preferred embodiment assumes that the protrusion 221d of the claw member 220 includes the protrusion inclined surface 221d1 in order to minimize the deformation occurring to the elastic member 230, the present invention is not limited thereto; a step portion 221d3 may be arranged at a radially inner surface of the protrusion 221d, via a radial gap therebetween, which may be included at the surface of the elastic member 230 making contact with the elastic member 230 in order to minimize the deformation of the elastic member 230 in the axial direction. As shown in FIG. 17, due to the gap between the elastic member 230 and the step portion 221d3, even when the claw member 220 moves in the axially downward direction, the deformation in the axially upward direction occurring to the elastic member 230 due to the protrusion 221d will be minimized. Note that the step portion 221d3 includes a surface which is substantially parallel with the claw portion 221, and a surface which is perpendicular to said surface extending radially inwardly. In particularly, the claw member 230 has the upper protrusion inclined surface part A1 including a first step portion 231d2 and a second step portion 231d3 lower than the first step portion 231d2. The first step portion 231d2 and the second step portion 231d3 are provided such that one end of the coil spring 230 moves from the first step portion 231d2 to the second step portion 231d3 when the tip portion 221b moves in the axially downward direction.

For example, the elastic member 230 of the present invention may make contact with the base portion 214 of the center case 210, or the elastic member 230 may make contact with the base portion 214 and also with the leveled portion 101a.

For example, although the present preferred embodiment of the present invention assumes that the opening 216 includes the widened portion 216b1, the present invention is not limited thereto. A through hole may be arranged penetrating between the top surface and the bottom surface of the top plate portion 215 which is circumferentially apart from the opening 216. In such case, the movement pivot receiving portion 217 is arranged at a position corresponding to the through hole. A circumferential width of the through hole is equal to or greater than that of the movement pivot receiving portion 217.

For example, although the present preferred embodiment of the present invention assumes that the opening 216 includes the widened portion 216b1, the present invention is not limited thereto. A through hole may be arranged penetrating between the top surface and the bottom surface of the top plate portion 215 which is circumferentially apart from the opening 216. In such case, the movement pivot receiving portion 217 is arranged at a position corresponding to the through hole. A circumferential width of the through hole is equal to or greater than that of the movement pivot receiving portion 217.

What is claimed is:

1. A chucking mechanism operable to detachably set thereon a discoid disk including a central opening portion, the chucking mechanism comprising:
   a center case arranged concentrically with a predetermined central axis, including a cylindrical portion which fits the central opening portion, a top plate covering an axially upper side of the cylindrical portion, and a plurality of openings arranged in a circumferential direction extending from the cylindrical portion to an outer circumferential side of the top plate portion;
   a claw member movable with respect to the opening, protruding in a radially outward direction from the cylindrical portion, and making contact with the central opening portion of the disk;
   a coil spring providing radial force to the claw member; and
   a turn table including a disk setting surface setting thereon the disk,
   wherein a tip portion arranged at a radially outmost portion of the claw member continues to move in an axially downward direction and a radially inward direction until the disk is set on the disk setting surface, wherein the claw member has a cross-section running through the central axis and a midpoint of a circumferential width of the tip portion, wherein the claw member has a protrusion extending radially inward, wherein the protrusion has a first surface which fits one end of the coil spring, the first surface having an upper protrusion inclined surface part and a lower protrusion inclined surface part, wherein a first line extended from the upper protrusion inclined surface part has a first angle with respect to the central axis in the cross-section, wherein a second line extended from the lower protrusion inclined surface part has a second angle with respect to the central axis in the cross-section, wherein the first angle is smaller than the second angle when the discoid disk is detached from the chucking mechanism, so as not to force the coil spring to be pressed in the axial direction when the tip portion moves in the axially downward direction.

2. The chucking mechanism according to claim 1, wherein a diameter of an area connecting the protrusion and the inner circumferential surface of the claw member is substantially equal to a diameter of the coil spring.

3. The chucking mechanism according to claim 1, wherein the protrusion inclined surface is inclined to be substantially perpendicular to the central axis, or such that the further radially inward a portion thereof is the axially lower the portion is when the tip portion is at an axially lowest point.

4. The chucking mechanism according to claim 1, wherein the claw member includes at a portion on the inner circumferential surface of the claw member below the protrusion in the axial direction an inner circumferential inclined surface inclined such that the further radially outward a portion thereof is the axially lower the portion is, and the inner circumferential inclined surface is substantially parallel with the central axis when the tip portion is at an axially lowest point.

5. The chucking mechanism according to claim 1, wherein the upper protrusion inclined surface part is provided such that the further radially inward a portion thereof is, the axially lower a portion thereof is.

6. The chucking mechanism according to claim 1, wherein the center case includes a base portion having a second surface making contact with the other end of the coil spring.

7. The chucking mechanism according to claim 6, wherein the surface includes a movement restricting indent portion restricting movement of the coil spring in the circumferential direction, and the top plate portion includes at a portion below a bottom surface thereof a lower contact surface restricts elastic member from making contact with the top plate.

8. The chucking mechanism according to claim 7, wherein the surface of the base portion includes a plane surface perpendicular to a direction the coil spring extends.

9. A chucking mechanism operable to detachably set thereon a discoid disk including a central opening portion, the chucking mechanism comprising:

a center case arranged concentrically with a predetermined central axis, including a cylindrical portion which fits the central opening portion, a top plate covering an axially upper side of the cylindrical portion, and a plurality of openings arranged in a circumferential direction extending from the cylindrical portion to an outer circumferential side of the top plate portion;

a claw member movable with respect to the opening, protruding in a radially outward direction from the cylindrical portion, and making contact with the central opening portion of the disk;

a coil spring providing radial force to the claw member; and a turn table including a disk setting surface setting thereon the disk, wherein a tip portion arranged at a radially outmost portion of the claw member continues to move in an axially downward direction and a radially inward direction until the disk is set on the disk setting surface, wherein the claw member has a cross-section running through the central axis and a midpoint of a circumferential width of the tip portion, wherein the claw member has a protrusion extending radially inward, wherein the protrusion has a first surface which fits one end of the coil spring, the first surface having an upper protrusion inclined surface part and a lower protrusion inclined surface part, wherein the cross-section has an upper inner surface part upwardly extended from the upper protrusion inclined surface part and a lower inner surface part downwardly extended from the lower protrusion inclined surface part, wherein a third line extended from the upper inner surface part has a third angle with respect to the central axis in the cross-section, wherein a fourth line extended from the lower inner surface part has a fourth angle with respect to the central axis in the cross-section, wherein the third angle is smaller than the fourth angle when the discoid disk is detached from the chucking mechanism, wherein the lower protrusion inclined surface part is substantially parallel with the central axis when the tip portion is at an axially lowest point.

10. The chucking mechanism according to claim 9, wherein the center case includes a base portion having a second surface making contact with the other end of the coil spring.

11. The chucking mechanism according to claim 10, wherein the surface includes a movement restricting indent portion restricting movement of the coil spring in the circumferential direction, and the top plate portion includes at a portion below a bottom surface thereof a lower contact surface restricts elastic member from making contact with the top plate.

12. The chucking mechanism according to claim 11, wherein the surface of the base portion includes a plane surface perpendicular to a direction the coil spring extends.

13. A chucking mechanism operable to detachably set thereon a discoid disk including a central opening portion, the chucking mechanism comprising:

a center case arranged concentrically with a predetermined central axis, including a cylindrical portion which fits the central opening portion, a top plate covering an axially upper side of the cylindrical portion, and a plurality of openings arranged in a circumferential direction extending from the cylindrical portion to an outer circumferential side of the top plate portion;

a claw member movable with respect to the opening, protruding in a radially outward direction from the cylindrical portion, and making contact with the central opening portion of the disk;

a coil spring providing radial force to the claw member; and a turn table including a disk setting surface setting thereon the disk, wherein a tip portion arranged at a radially outmost portion of the claw member continues to move in an axially downward direction and a radially inward direction until the disk is set on the disk setting surface, wherein the claw member has a cross-section running through the central axis and a midpoint of a circumferential width of the tip portion, wherein the claw member has a protrusion extending radially inward, wherein the protrusion has a first surface which fits one end of the coil spring, the first surface having an upper protrusion inclined surface part and a lower protrusion inclined surface part, wherein the upper protrusion inclined surface part includes a first step portion and a second step portion lower than the first step portion provided such that said one end of the coil spring moves from the first step portion to the second step portion when the tip portion moves in the axially downward direction, so as not the force the coil spring to be pressed in the axial direction when the tip portion moves in the axially downward direction.

14. A brushless motor including the chucking mechanism according to claim 1, the motor comprising:

a rotor portion having therein a rotor magnet rotating concentrically with the central axis, and a stator portion having therein a stator arranged opposite from the rotor magnet rotatably supporting the rotor portion.

15. A brushless motor including the chucking mechanism according to claim 2, the motor comprising:

a rotor portion having therein a rotor magnet rotating concentrically with the central axis, and a stator portion having therein a stator arranged opposite from the rotor magnet rotatably supporting the rotor portion.

16. A disk driving apparatus including the brushless motor according to claim 14, the apparatus comprising:

an optical unit optically storing data on the disk and reproducing data on the disk, and a gear mechanism moving the optical unit in the radial direction.

17. A disk driving apparatus including the brushless motor according to claim 15, the apparatus comprising:

an optical unit optically strong data on the disk and reproducing data on the disk, and a gear mechanism moving the optical unit in the radial direction.

18. The chucking mechanism according to claim 1, wherein the cross-section has an upper inner surface part upwardly extended from the upper protrusion inclined surface part and a lower inner surface part downwardly extended from the lower protrusion inclined surface part, wherein a third line extended from the upper inner surface part has a third angle with respect to the central axis in the cross-section, wherein a fourth line extended from the lower inner surface part has a fourth angle with respect to the central axis in the cross-section, wherein the third angle is smaller than the fourth angle.

* * * * *